(12) United States Patent
Suh et al.

(10) Patent No.: US 11,239,948 B2
(45) Date of Patent: Feb. 1, 2022

(54) BCC PUNCTURING PATTERNS FOR DATA RETRANSMISSION IN WIRELESS NETWORK

(71) Applicant: Huawei Technologies Co., Ltd., Shenzhen (CN)

(72) Inventors: Jung Hoon Suh, Ottawa (CA); Yan Xin, Ottawa (CA); Osama Aboul-Magd, Ottawa (CA); Sheng Sun, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/809,347

(22) Filed: Mar. 4, 2020

(65) Prior Publication Data

US 2020/0287660 A1 Sep. 10, 2020

Related U.S. Application Data

(60) Provisional application No. 62/814,490, filed on Mar. 6, 2019.

(51) Int. Cl.
*H04L 1/00* (2006.01)
*H04L 1/24* (2006.01)
*H04W 84/12* (2009.01)

(52) U.S. Cl.
CPC .......... *H04L 1/0059* (2013.01); *H04L 1/0061* (2013.01); *H04L 1/0069* (2013.01); *H04L 1/246* (2013.01); *H04W 84/12* (2013.01)

(58) Field of Classification Search
CPC ... H04L 1/0059; H04L 1/0069; H04L 1/0061; H04L 1/246; H04L 1/0041; H04L 1/1819;
(Continued)

(56) References Cited

U.S. PATENT DOCUMENTS

| | | | | |
|---|---|---|---|---|
| 2003/0212946 A1* | 11/2003 | Kroeger | ................ | H03M 13/25 714/786 |
| 2008/0270843 A1* | 10/2008 | Winarski | .............. | G06F 3/0607 714/42 |

(Continued)

FOREIGN PATENT DOCUMENTS

| | | |
|---|---|---|
| CN | 102916707 A | 2/2013 |
| CN | 106533610 A | 3/2017 |

(Continued)

OTHER PUBLICATIONS

S. Kallel, "Complementary Punctured Convolutional (CPC) Codes and Their Applications", IEEE Transactions on Communications, vol. 43, No. 6, Jun. 1995 1995.

*Primary Examiner* — Jung Liu
(74) *Attorney, Agent, or Firm* — Slater Matsil, LLP

(57) ABSTRACT

Transmitting, in a wireless local area network (WLAN), a second punctured coded bit sequence generated by puncturing coded data using a second puncturing pattern, wherein the coded data has previously been punctured using a first puncturing pattern to generate a first punctured coded bit sequence transmitted in the WLAN. The second puncturing pattern is different than the first puncturing pattern to cause at least some bits of the coded data that were omitted in the first punctured coded bit sequence to be included in the second punctured coded bit sequence.

20 Claims, 10 Drawing Sheets

(58) Field of Classification Search
CPC ... H04L 1/1896; H04L 1/0013; H04L 1/0071; H04L 1/08; H04L 1/0068; H04L 1/0035; H04L 1/0003; H04L 1/0009; H04L 27/3488; H04L 27/362; H04L 1/1864; H04L 1/0026; H04L 1/0033; H04W 84/12; H04W 52/42
See application file for complete search history.

(56) References Cited

U.S. PATENT DOCUMENTS

| | | | |
|---|---|---|---|
| 2009/0154458 A1* | 6/2009 | Kim | H04L 1/0013 370/390 |
| 2012/0230448 A1* | 9/2012 | Kang | H04L 1/0643 375/295 |
| 2012/0314711 A1* | 12/2012 | Trachewsky | H03M 13/6356 370/393 |
| 2016/0099796 A1* | 4/2016 | Yang | H04L 27/12 714/776 |
| 2016/0241682 A1* | 8/2016 | Xu | H04L 1/0041 |
| 2017/0366200 A1* | 12/2017 | Murakami | H03M 13/616 |
| 2020/0274640 A1* | 8/2020 | Wilhelmsson | H04L 1/0033 |

FOREIGN PATENT DOCUMENTS

| | | |
|---|---|---|
| CN | 107431575 A | 12/2017 |
| EP | 3226641 A1 | 10/2017 |
| WO | 2017083285 A1 | 5/2017 |

* cited by examiner

BCC PUNCTURING PATTERNS FOR DATA RETRANSMISSION IN WIRELESS NETWORK

RELATED APPLICATIONS

This application claims the benefit of and priority to U.S. Provisional Patent Application No. 62/814,490 filed Mar. 6, 2019, entitled "BCC PUNCTURING PATTERNS FOR DATA RETRANSMISSION IN WIRELESS NETWORK", the contents of which are incorporated herein by reference.

TECHNICAL FIELD

The present application relates to mobile air interface technologies, in particular to methods and systems for retransmitting data.

BACKGROUND

Forward error correction (FEC) coding is commonly used as an error-control method for data transmission to improve reliability in a communication system such as a wireless communication system. One FEC method employs binary convolutional coding (BCC). Among other things, BCC can be applied to data transmitted in wireless networks such as local area wireless networks (WLAN), including Wi-Fi networks that operate in accordance with the IEEE 802.11 family of protocols. Wi-Fi protocols such as IEEE 802.11a/n/ac/ad and IEEE std 802.11™-2016 (collectively the IEEE 802.11 protocol) specify a BCC encoding process in which a rate 1:2 intermediate output is generated according to two generator polynomials (e.g. $g_o$ and $g_1$), and then punctured to achieve a specified BCC code rate output. By way of example, FIG. 1 illustrates an example of BCC code rate ¾ encoding performed by BCC encoder 10' in accordance with the current IEEE 802.11 protocol. As illustrated in FIG. 1, an input sequence of k=9 data bits $u=[X_0,X_1,X_2,X_3,X_4,X_5,X_6,X_7,X_8]$ (with subscript 0 indicating the first bit in the sequence) is input to a rate ½ BCC encoding operation 12. First and second coded sequences A and B, each including k=9 coded bits, are generated according to respective generator polynomials $g_o$ ($133_8$) and $g_1$ ($171_8$). Coded Sequences A and B, which collectively have a total of 2k=18 bits, are subjected to puncturing by a puncturing operation 14. In particular, the coded sequences A and B are combined by alternatively selecting bits from each sequence, subject to a puncturing pattern that specifies bits that are to be omitted from the combined sequence. The resulting output is a BCC code rate ¾ output bit sequence of n=12 coded, punctured bits, $v=[A_0,B_0,A_1,B_2,A_3,B_3,A_4,B_5,A_6,B_6,A_7,B_8]$.

In FIG. 1, the puncturing pattern is illustrated as a 2 by k=9 matrix, puncturing pattern=

$$\begin{pmatrix} 110110110 \\ 101101101 \end{pmatrix}.$$

The bit positions in the first row of the puncturing pattern correspond to the bit positions of sequence A, and the bit positions in the second row correspond to the bit positions of sequence B, with a "1" in the puncturing pattern indicating a sequence bit to be included in the output sequence v and a "0" in the puncturing pattern indicating a sequence bit that is to be excluded from the output sequence v.

The ¾ rate BCC encoding process of FIG. 1 is represented in a different visual format in FIG. 2. In FIG. 2, each bit position of coded bit sequences A and B is represented as a respective square box. The puncturing pattern $$\begin{pmatrix} 110110110 \\ 101101101 \end{pmatrix}$$

is illustrated as bold square boxes overlaid on the corresponding bit positions of sequences A and B. The bold square boxes indicate bits that are to be punctured or "lost" and not included in the output coded bit sequence v.

Another error control method applied to improve reliability in a communication system such as a wireless communication system is automatic repeat request (ARQ). ARQ protocols typically use acknowledgements and timeouts that allow a transmitter to detect if an error has occurred in respect of a previously transmitted data frame, and retransmit some or all of the data frame if an error is detected. The combination of FEC coding and ARQ error control methods is known as hybrid ARQ (HARQ). In HARQ, aspects of the FEC coding applied to retransmitted data can be modified between a first transmission and a retransmission, enabling the receiver to soft combine results from the two transmissions and thereby improve chances of successful decoding.

Further development of HARQ error-control systems and methods, including systems and methods for use in extremely high throughput wireless local area network (WLAN) systems such as Wi-Fi, is desirable. In particular, it is desired to improve the performance of HARQ retransmissions, and to reduce the number of retransmissions required.

SUMMARY

According to a first example aspect, methods and devices are disclosed for transmitting data for retransmission to support hybrid automatic repeat request (HARQ), comprising using a puncturing pattern to encode data for a second HARQ retransmission wherein the puncturing pattern is complementary to a puncturing pattern used to encode the data for a first HARQ retransmission.

According to one example aspect a method is disclosed that includes transmitting, in a wireless local area network (WLAN), a second punctured coded bit sequence generated by puncturing coded data using a second puncturing pattern, wherein the coded data has previously been punctured using a first puncturing pattern to generate a first punctured coded bit sequence transmitted in the WLAN. The second puncturing pattern is different than the first puncturing pattern to cause at least some bits of the coded data that were omitted in the first punctured coded bit sequence to be included in the second punctured coded bit sequence.

In some example embodiments, the coded data includes a first binary convolution coding (BCC) sequence and a second BCC sequence that have each been generated by applying binary convolution coding to an input bit sequence, the first punctured coded bit sequence including bits selected alternatively from each of the first BCC coded sequence and the second BCC sequence subject to the first puncturing pattern, the second punctured coded bit sequence including bits selected alternatively from each of the first BCC coded sequence and the second BCC sequence subject to the second puncturing pattern.

In some examples, the first punctured coded bit sequence and second punctured code bit sequence each have a coding rate of ¾; 9 bit sequences of the input bit sequence are each BCC coded according to first and second generator polynomials to generate 9 coded bits of the first BCC sequence and 9 coded bits of the second BCC sequence, respectively; the first puncturing pattern indicates 3 bits of the 9 coded bits of the first BCC sequence and 3 bits of the second BCC sequence to omit from bits included in a 12 bit sequence of the first punctured coded bit sequence; and the second puncturing pattern indicates 3 bits of the 9 coded bits of the first BCC sequence and 3 bits of the second BCC sequence to omit from bits included in a 12 bit sequence of the second punctured coded bit sequence. In some examples, the first puncturing pattern and the second puncturing pattern are each from following group of puncturing patterns: puncturing pattern p1: omit bits 3, 6, and 9 of the first BCC sequence and bits 2, 5 and 8 of the second BCC sequence; puncturing pattern p2: omit bits 2, 5, and 8 of the first BCC sequence and bits 1, 4 and 7 of the second BCC sequence; puncturing pattern p3: omit bits 1, 4, and 7 of the first BCC sequence and bits 3, 6 and 9 of the second BCC sequence; puncturing pattern p4: omit bits 3, 6, and 9 of the first BCC sequence and bits 1, 4 and 7 of the second BCC sequence; puncturing pattern p5: omit bits 1, 4, and 7 of the first BCC sequence and bits 2, 5 and 8 of the second BCC sequence; and puncturing pattern p6: omit bits 2, 5, and 8 of the first BCC sequence and bits 3, 6 and 9 of the second BCC sequence.

In some examples, the method includes, prior to transmitting the second punctured coded bit sequence, transmitting, in the WLAN, the first punctured coded bit sequence, wherein the first puncturing pattern is one of puncturing pattern p1, puncturing pattern p2 and puncturing pattern p3, and the second puncturing pattern is a different one of puncturing pattern p1, puncturing pattern p2 and puncturing pattern p3. In some examples, the first puncturing pattern is puncturing pattern p1 and the second puncturing pattern is one of puncturing pattern p2 and puncturing pattern p3.

In some examples, a third punctured coded bit sequence is generated by puncturing the coded data using a third puncturing pattern, the third puncturing pattern being different than at least the second puncturing pattern. The third puncturing pattern may, in some examples, be one of puncturing pattern p1, puncturing pattern p2 and puncturing pattern p3. In some examples, a fourth punctured coded bit sequence is generated by puncturing the coded data using a fourth puncturing pattern that is one of puncturing pattern p4, puncturing pattern p5 and puncturing pattern p6.

According to some examples, the first punctured coded bit sequence and second punctured code bit sequence each have a coding rate of ⅔; 6 bit sequences of the input bit sequence are each BCC coded according to first and second generator polynomials to generate 6 coded bits of the first BCC sequence and 6 coded bits of the second BCC sequence, respectively; the first puncturing pattern indicates 3 bits in total of the first BCC sequence and the second BCC sequence to omit from bits included in a 9 bit sequence of the first punctured coded bit sequence; and the second puncturing pattern indicates 3 bits in total of the first BCC sequence and the second BCC sequence to omit from bits included in a 9 bit sequence of the second punctured coded bit sequence. In some examples, the first puncturing pattern and the second puncturing pattern are each from the following group of puncturing patterns: puncturing pattern q1: omit bits 2, 4, and 5 of the second BCC sequence; puncturing pattern q2: omit bits 1, 3, and 5 of the second BCC sequence; puncturing pattern q3: omit bits 1, 3, and 5 of the first BCC sequence; puncturing pattern q4: omit bits 2, 4, and 5 of the first BCC sequence; puncturing pattern q5: omit bit 4 of the first BCC sequence and bits 2 and 6 of the second BCC sequence; puncturing pattern q6: omit bit 3 of the first BCC sequence and bits 1 and 5 of the second BCC sequence; puncturing pattern q7: omit bit 2 of the first BCC sequence and bits 4 and 6 of the second BCC sequence; puncturing pattern q8: omit bit 1 of the first BCC sequence and bits 3 and 5 of the second BCC sequence; puncturing pattern q9: omit bit 6 of the first BCC sequence and bits 2 and 4 of the second BCC sequence; puncturing pattern q10: omit bit 5 of the first BCC sequence and bits 1 and 3 of the second BCC sequence; puncturing pattern q11: omit bits 2 and 6 of the first BCC sequence and bit 4 of the second BCC sequence; puncturing pattern q12: omit bits 1 and 5 of the first BCC sequence and bit 3 of the second BCC sequence; puncturing pattern q13: omit bits 4 and 6 of the first BCC sequence and bit 2 of the second BCC sequence; puncturing pattern q14: omit bits 3 and 5 of the first BCC sequence and bit 1 of the second BCC sequence; puncturing pattern q15: omit bits 2 and 4 of the first BCC sequence and bit 6 of the second BCC sequence; and puncturing pattern q16: omit bits 1 and 3 of the first BCC sequence and bit 5 of the second BCC sequence.

In some examples, prior to transmitting the second punctured coded bit sequence the WLAN, the first punctured coded bit sequence is transmitted, the first puncturing pattern is one of puncturing pattern q1 and puncturing pattern q2 and the second puncturing pattern is the other of puncturing pattern q1 and puncturing pattern q2. In some examples, the first puncturing pattern is puncturing pattern q1 and the second puncturing pattern is puncturing pattern q2. In some examples, for a third transmission, a third punctured coded bit sequence is generated by puncturing the coded data using a third puncturing pattern, the third puncturing pattern being different than at least the second puncturing pattern. In some examples the third puncturing pattern is one of puncturing pattern q3 and puncturing pattern q4. In some examples, for a fourth transmission, a fourth punctured coded bit sequence is generated by puncturing the coded data using a fourth puncturing pattern that is different that the third puncturing pattern and is one of puncturing pattern q3 and puncturing pattern q4.

In some examples embodiments, the first punctured coded bit sequence and second punctured code bit sequence each have a coding rate of ⅚; 5 bit sequences of the input bit sequence are each BCC coded according to first and second generator polynomials to generate 5 coded bits of the first BCC sequence and 5 coded bits of the second BCC sequence, respectively; the first puncturing pattern indicates 2 bits of the first BCC sequence and 2 bits of the second BCC sequence to omit from bits included in a 6 bit sequence of the first punctured coded bit sequence; and the second puncturing pattern indicates 2 bits of the first BCC sequence and 2 bits of the second BCC sequence to omit from bits included in a 6 bit sequence of the second punctured coded bit sequence. In example embodiments, the first puncturing pattern and the second puncturing pattern are each from the following group of puncturing patterns: puncturing pattern r1: omit bits 3 and 5 of the first BCC sequence and bits 2 and 4 of the second BCC sequence; puncturing pattern r2: omit bits 2 and 4 of the first BCC sequence and bits 1 and 3 of the second BCC sequence; puncturing pattern r3: omit bits 1 and 3 of the first BCC sequence and bits 2 and 5 of the second BCC sequence; puncturing pattern r4: omit bits 2 and 5 of the first BCC sequence and bits 1 and 4 of the second BCC sequence; puncturing pattern r5: omit bits 1 and 4 of the first BCC sequence and bits 3 and 5 of the second BCC sequence; puncturing pattern r6: omit bits 2 and 5 of the first BCC sequence and bits 1 and 3 of the second BCC sequence; puncturing pattern r7: omit bits 2 and 4 of the first BCC sequence and bits 3 and 5 of the second BCC sequence; puncturing pattern r8: omit bits 3 and 5 of the first BCC sequence and bits 1 and 4 of the second BCC sequence; and puncturing pattern r9: omit bits 1 and 4 of the first BCC sequence and bits 2 and 5 of the second BCC sequence.

In some examples, the method includes prior to transmitting the second punctured coded bit sequence, transmitting, in the WLAN, the first punctured coded bit sequence, wherein the first puncturing pattern is one of puncturing pattern r1 and puncturing pattern r2 and the second puncturing pattern is the other of puncturing pattern r1 and puncturing pattern r2. In some examples, the first puncturing pattern is puncturing pattern r1 and the second puncturing pattern is puncturing pattern r2. In some examples, for a third transmission, a third punctured coded bit sequence is generated by puncturing the coded data using a third puncturing pattern, the third puncturing pattern being different than at least the second puncturing pattern. In some examples, the third puncturing pattern is one of puncturing pattern r3 to puncturing pattern r9.

In any of the preceding examples, the second punctured coded bit sequence can be transmitted as part of a data unit that includes a header field indicating the second puncturing pattern. In any of the preceding examples, the second punctured coded bit sequence can be transmitted as part of a data unit that includes a header field indicating that the second punctured coded bit sequence corresponds to a first re-transmission.

According to a further example aspect is a method of transmitting hybrid automatic repeat request (HARQ) re-transmissions in a wireless local area network (WLAN), including transmitting, in a wireless local area network (WLAN), a data unit including a re-transmission punctured coded bit sequence generated by puncturing coded data using a retransmission puncturing pattern, wherein the coded data has previously been punctured using a different puncturing pattern to generate a different punctured coded bit sequence transmitted in the WLAN, the data unit including a header field that includes a HARQ retransmission index indicating which transmission event in a set of possible transmission events the punctured coded bit sequence corresponds to.

According to a further example aspect is an encoder for encoding data for transmission in a wireless local area network (WLAN), the encoder being configured to: apply binary convolution coding (BCC) to an input bit sequence using a first generator polynomial and a second generator polynomial to respectively generate a first BCC sequence of coded bits and a second BCC sequence of coded bits; combine the coded bits from the first BCC sequence and second BCC sequence subject to a first puncturing pattern to generate a first punctured coded bit sequence for transmission in the WLAN; and combine the coded bits from the first BCC sequence and second BCC sequence subject to a second puncturing pattern that is different that the first puncturing pattern to generate a second punctured coded bit sequence for transmission in the WLAN that includes at least some coded bits that are omitted from the first punctured coded bit sequence.

In at least some examples of the further example aspect, the encoder is configured to apply a coding rate of ¾, ⅔ or ⅚. When the encoder applies a coding rate of ¾, 9 bit sequences of the input bit sequence are each BCC coded to generate 9 coded bits of the first BCC sequence and 9 coded bits of the second BCC sequence, respectively, the first puncturing pattern indicates 3 bits of the 9 coded bits of the first BCC sequence and 3 bits of the second BCC sequence to omit from bits included in a 12 bit sequence of the first punctured coded bit sequence, the second puncturing pattern indicates 3 bits of the 9 coded bits of the first BCC sequence and 3 bits of the second BCC sequence to omit from bits included in a 12 bit sequence of the second punctured coded bit sequence, and the first puncturing pattern and the second puncturing pattern are each from following group of puncturing patterns: puncturing pattern p1: omit bits 3, 6, and 9 of the first BCC sequence and bits 2, 5 and 8 of the second BCC sequence; puncturing pattern p2: omit bits 2, 5, and 8 of the first BCC sequence and bits 1, 4 and 7 of the second BCC sequence; puncturing pattern p3: omit bits 1, 4, and 7 of the first BCC sequence and bits 3, 6 and 9 of the second BCC sequence; puncturing pattern p4: omit bits 3, 6, and 9 of the first BCC sequence and bits 1, 4 and 7 of the second BCC sequence; puncturing pattern p5: omit bits 1, 4, and 7 of the first BCC sequence and bits 2, 5 and 8 of the second BCC sequence; and puncturing pattern p6: omit bits 2, 5, and 8 of the first BCC sequence and bits 3, 6 and 9 of the second BCC sequence.

According to examples, when the encoder applies a coding rate of ⅔: 6 bit sequences of the input bit sequence are each BCC coded to generate 6 coded bits of the first BCC sequence and 6 coded bits of the second BCC sequence, respectively, the first puncturing pattern indicates 3 bits in total of the first BCC sequence and the second BCC sequence to omit from bits included in a 9 bit sequence of the first punctured coded bit sequence, the second puncturing pattern indicates 3 bits in total of the first BCC sequence and the second BCC sequence to omit from bits included in a 9 bit sequence of the second punctured coded bit sequence, and the first puncturing pattern and the second puncturing pattern are each from the following group of puncturing patterns: puncturing pattern q1: omit bits 2, 4, and 5 of the second BCC sequence; puncturing pattern q2: omit bits 1, 3, and 5 of the second BCC sequence; puncturing pattern q3: omit bits 1, 3, and 5 of the first BCC sequence; puncturing pattern q4: omit bits 2, 4, and 5 of the first BCC sequence; puncturing pattern q5: omit bit 4 of the first BCC sequence and bits 2 and 6 of the second BCC sequence; puncturing pattern q6: omit bit 3 of the first BCC sequence and bits 1 and 5 of the second BCC sequence; puncturing pattern q7: omit bit 2 of the first BCC sequence and bits 4 and 6 of the second BCC sequence; puncturing pattern q8: omit bit 1 of the first BCC sequence and bits 3 and 5 of the second BCC sequence; puncturing pattern q9: omit bit 6 of the first BCC sequence and bits 2 and 4 of the second BCC sequence; puncturing pattern q10: omit bit 5 of the first BCC sequence and bits 1 and 3 of the second BCC sequence; puncturing pattern q11: omit bits 2 and 6 of the first BCC sequence and bit 4 of the second BCC sequence; puncturing pattern q12: omit bits 1 and 5 of the first BCC sequence and bit 3 of the second BCC sequence; puncturing pattern q13: omit bits 4 and 6 of the first BCC sequence and bit 2 of the second BCC sequence; puncturing pattern q14: omit bits 3 and 5 of the first BCC sequence and bit 1 of the second BCC sequence; puncturing pattern q15: omit bits 2 and 4 of the first BCC sequence and bit 6 of the second BCC sequence; and puncturing pattern q16: omit bits 1 and 3 of the first BCC sequence and bit 5 of the second BCC sequence.

According to examples, when the encoder applies a coding rate of ⅚: 5 bit sequences of the input bit sequence are each BCC coded to generate 5 coded bits of the first BCC sequence and 5 coded bits of the second BCC sequence, respectively; the first puncturing pattern indicates 2 bits of the first BCC sequence and 2 bits of the second BCC sequence to omit from bits included in a 6 bit sequence of the first punctured coded bit sequence; the second puncturing pattern indicates 2 bits of the first BCC sequence and 2 bits of the second BCC sequence to omit from bits included in a 6 bit sequence of the second punctured coded bit sequence; and the first puncturing pattern and the second puncturing pattern are each from the following group of puncturing patterns: puncturing pattern r1: omit bits 3 and 5 of the first BCC sequence and bits 2 and 4 of the second BCC sequence; puncturing pattern r2: omit bits 2 and 4 of the first BCC sequence and bits 1 and 3 of the second BCC sequence; puncturing pattern r3: omit bits 1 and 3 of the first BCC sequence and bits 2 and 5 of the second BCC sequence; puncturing pattern r4: omit bits 2 and 5 of the first BCC sequence and bits 1 and 4 of the second BCC sequence; puncturing pattern r5: omit bits 1 and 4 of the first BCC sequence and bits 3 and 5 of the second BCC sequence; puncturing pattern r6: omit bits 2 and 5 of the first BCC sequence and bits 1 and 3 of the second BCC sequence; puncturing pattern r7: omit bits 2 and 4 of the first BCC sequence and bits 3 and 5 of the second BCC sequence; puncturing pattern r8: omit bits 3 and 5 of the first BCC sequence and bits 1 and 4 of the second BCC sequence; and puncturing pattern r9: omit bits 1 and 4 of the first BCC sequence and bits 2 and 5 of the second BCC sequence.

BRIEF DESCRIPTION OF THE DRAWINGS

Reference will now be made, by way of example, to the accompanying figures which show example embodiments of the present application, and in which:

FIGS. 8 to 23 illustrate puncturing patterns for BCC rate ⅔ encoding, according to example embodiments;

FIGS. 24 to 32 illustrate puncturing patterns for BCC rate ⅚ encoding, according to example embodiments;

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Figures 1, 2:
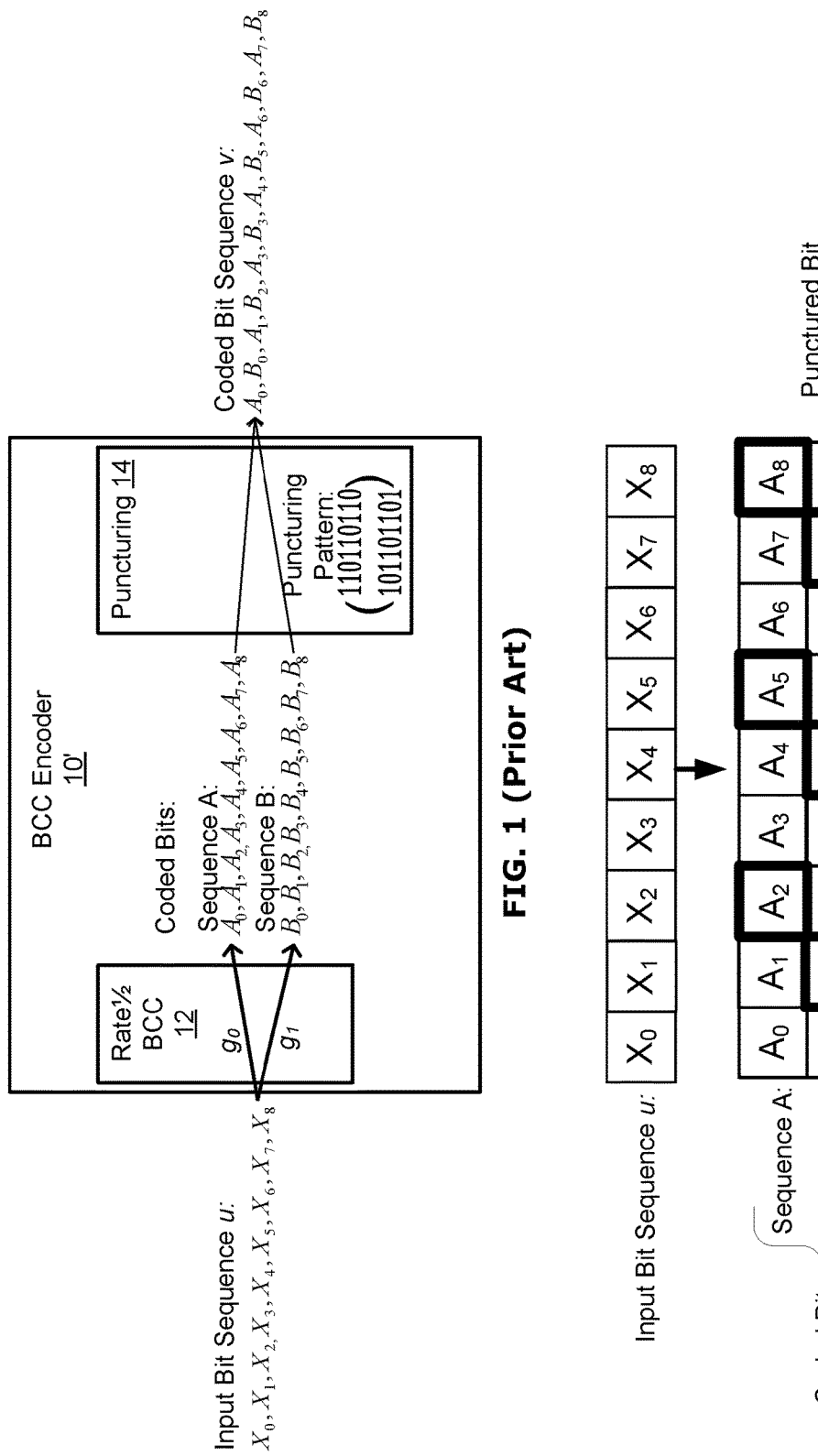
FIG. 1 is a block diagram illustrating a prior art rate ¾ binary convolution coding (BCC) encoder.
FIG. 2 is a further representation of the BCC process of FIG. 1.

The present disclosure teaches methods, devices, and systems for retransmitting data in a wireless network. Next generation WLAN systems, including for example next generation extremely high throughput (EHT) Wi-Fi systems, will require higher data rates and higher reliability than prior generation systems. HARQ error control methods may help achieve high data rate and reliability goals in next generation EHT Wi-Fi systems, including for example systems that conform to future IEEE 802.11 protocols.

One option for improving the performance of HARQ is to use different puncturing patterns in the FEC codes used during retransmissions. Accordingly, the present disclosure describes puncturing pattern candidates for retransmissions in HARQ. As noted in S. Kallel, "Complementary Punctured Convolutional (CPC) Codes and Their Applications", IEEE Transactions on Communications, Vol. 43, No. 6, June 1995, desired puncturing pattern criteria for HARQ applications include: (1) the puncturing pattern for a data retransmission should be a column-wise cyclic shift version of the puncturing pattern for the original transmission, to preserve the distance property of the original punctured convolutional code; and (2) the puncturing pattern for a data retransmission should be complementary to the puncturing pattern applied to the original transmission (i.e. the punctured bits that were not transmitted during the original transmission should be included in the retransmission) to facilitate combining, by the receiver, of information from the original transmission and retransmission.

Example embodiments are directed to puncturing patterns that can be applied for multiple retransmissions in a HARQ scheme. The current IEEE 802.11 protocol describes only a single puncturing pattern for each BCC (generator polynomial $133_8$ and $177_8$) code rate. Accordingly, current IEEE 802.11 protocol does not provide multiple puncturing patterns for each BCC code rate that would be beneficial for HARQ retransmission schemes. Accordingly, in the present disclosure, a set of puncturing patterns are described for each of (a) BCC code rate ¾ encoding; (b) BCC code rate ⅔ encoding; and (c) BCC code rate ⅚ rate encoding, for the purpose of supporting retransmissions in a HARQ enabled WLAN, and in particular to support Wi-Fi networks that conform to future IEEE 802.11 protocols that incorporate the puncturing patterns specified in the current 802.11 protocol.

In example embodiments, the set of puncturing patterns for each code rate are configured according to the following criteria:

Criteria (1): If possible, the puncturing pattern for a data retransmission should be complementary to puncturing patterns used in any prior transmissions (including the original transmission and any intervening retransmissions).

Criteria (2): In the event that the puncturing pattern for a data retransmission cannot be complementary to the puncturing patterns used in all prior transmissions, the puncturing pattern should, if possible, be complementary to the puncturing pattern used for the immediately prior transmission and, to the extent possible, at least partially complementary to the puncturing patterns for any transmissions prior to the immediately prior transmission.

Criteria (3): In the event that the puncturing pattern for a data retransmission cannot be complementary to the puncturing pattern used in an immediately prior transmission, the puncturing pattern should be partially semi-complementary to the puncturing pattern used for the immediately prior transmission and, to the extent possible, at least partially complementary to the puncturing patterns for any transmissions prior to the immediately prior transmission.

Criteria (4): When not in conflict with the above criteria, the puncturing pattern for a data retransmission should be a cyclically shifted version of the puncturing pattern for the immediately prior transmission, thereby maintaining the same free space property as the immediately prior transmission.

In the present disclosure, puncturing patterns are partially complementary if some, but not all, of the punctured bits that were not transmitted during the original transmission are included in the retransmission.

BCC Code Rate ¾

A set of puncturing patterns for use in a HARQ scheme for BCC code rate ¾ will now be described. The puncturing patterns are intended to be applied by a BCC encoder such as that used in current 802.11 protocol compliant transmitters and described above in respect of FIGS. 1 and 2. In this regard, in an example embodiment, the BCC code rate ¾ puncturing pattern specified in the current 802.11 protocol and illustrated in FIGS. 1 and 2 is included in the set for use as the puncturing pattern in respect of an original data transmission. As indicated in FIG. 2, the bits $A_0, B_0, A_1, B_1, \ldots, B_7, A_8, B_8$ are the coded bits and the puncturing pattern $$p1 = \begin{pmatrix} 110110110 \\ 101101101 \end{pmatrix}$$

repeats every 18 coded bits. As noted above, in FIG. 2 the bit positions enclosed by bold squares, $B_1, A_2, B_4, A_5, B_7, A_8$, are the punctured bit positions.

Figure 3:
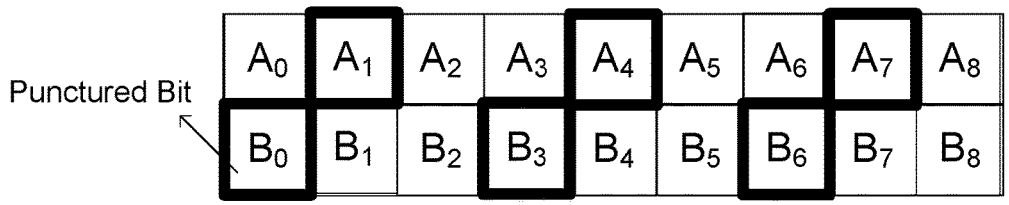
FIGS. 3 to 7 illustrate puncturing patterns for BCC rate ¾ encoding, according to example embodiments.
Figure 4:
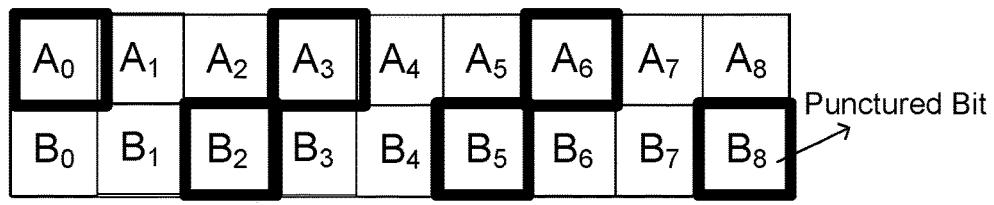

In the case of BCC code rate ¾, there are two possible puncturing patterns that meet the dual criteria of being complementary to and cyclically column shifted versions of the original transmission puncturing pattern p1. One option is puncturing pattern $$p2 = \begin{pmatrix} 101101101 \\ 011011011 \end{pmatrix},$$

which is illustrated in FIG. 3. In the puncturing pattern of FIG. 3, the bits $A_0, B_0, A_1, B_1, \ldots, B_7, A_8, B_8$ are the coded bits, the puncturing pattern repeats every 18 coded bits, and $B_0, A_1, B_3, A_4, B_6, A_7$ are the punctured bit positions. The other option is puncturing pattern $$p3 = \begin{pmatrix} 011011011 \\ 110110110 \end{pmatrix},$$

illustrated in FIG. 4. In the puncturing pattern of FIG. 4, the bits $A_0, B_0, A_1, B_1, \ldots, B_7, A_8, B_8$ are the coded bits, the puncturing pattern repeats every 18 coded bits, and $A_1, B_2, A_3, B_5, A_6, B_8$ are the punctured bit positions.

Accordingly, in example embodiments, puncturing pattern p1 is used for an original transmission, and if a 1$^{st}$ retransmission is required, one of puncturing patterns p2 and p3 is used for the 1$^{st}$ retransmission, and if a 2$^{nd}$ retransmission is required, the other one of puncturing patterns p2 and p3 is used for a 2$^{nd}$ retransmission.

Because there is no puncturing pattern that is complementary to all three of puncturing patterns p1, p2 and p3, in the event that a 3$^{rd}$ retransmission it will be necessary to use a puncturing pattern that is not complementary to the puncturing pattern of all prior transmissions. As per criteria (2) noted above, in example embodiments, the puncturing pattern used for the 3$^{rd}$ retransmission should be complementary to that used for the 2$^{nd}$ retransmission and partially complementary to that the puncturing patterns used for the original transmission and 1$^{st}$ retransmission. In this regard, FIG. 5 illustrates a further puncturing pattern $$p4 = \begin{pmatrix} 110110110 \\ 011011011 \end{pmatrix}.$$

Figure 5:
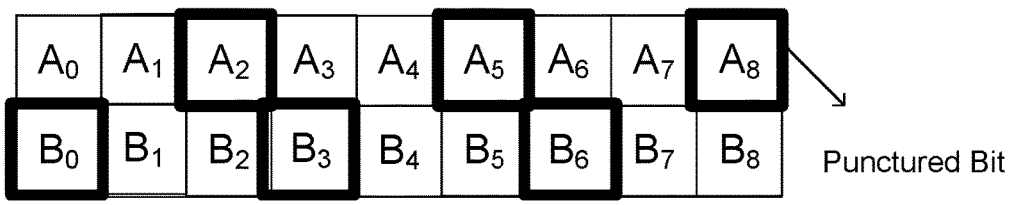

In the puncturing pattern of FIG. 5, the bits $A_0, B_0, A_1, B_1, \ldots, B_7, A_8, B_8$ are the coded bits, the puncturing pattern repeats every 18 coded bits, and $B_0, A_2, B_3, A_5, B_6, A_8$ are the punctured bit positions. The puncturing pattern p4 is complementary to puncturing pattern p3 and partially complementary to puncturing patterns p1 and p2. Accordingly, in one example embodiment, the puncturing patterns p1, p2, p3 and p4 are respectively applied for an original transmission, a 1$^{st}$ retransmission, a 2$^{nd}$ retransmission and a 3$^{rd}$ retransmission, in that order.

Figure 6:
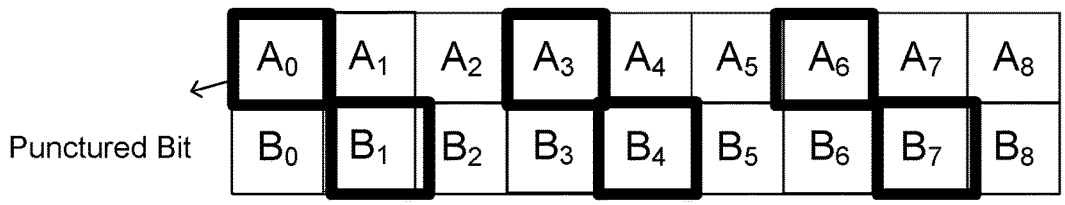

FIG. 6 illustrates a further puncturing pattern $$p5 = \begin{pmatrix} 011011011 \\ 101101101 \end{pmatrix}.$$

In the puncturing pattern of FIG. 6, the bits $A_0, B_0, A_1, B_1, \ldots, B_7, A_8, B_8$ are the coded bits, the puncturing pattern repeats every 18 coded bits, and $A_0, B_1, A_3, B_4, A_6, B_7$, are the punctured bit positions. The puncturing pattern p5 is complementary to puncturing pattern p2 and partially complementary to puncturing patterns p1 and p3. According, in one example embodiment, the puncturing patterns p1, p3, p2 and p5 are respectively applied for an original transmission, a 1$^{st}$ retransmission, a 2$^{nd}$ retransmission and a 3$^{rd}$ retransmission, in that order.

Figure 7:
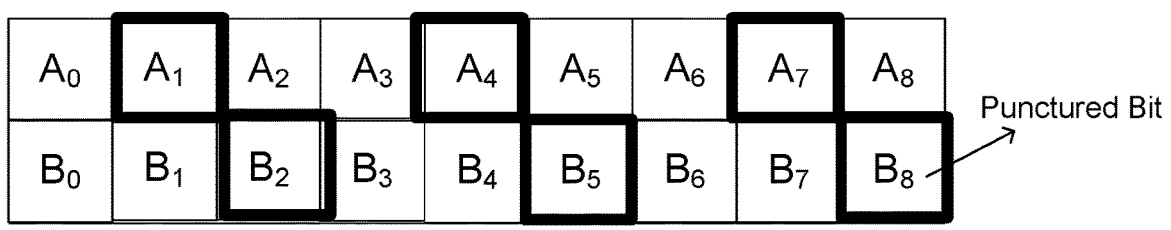

FIG. 7 illustrates a further puncturing pattern $$p6 = \begin{pmatrix} 101101101 \\ 110110110 \end{pmatrix}.$$

In the puncturing pattern of FIG. 7, the bits $A_0, B_0, A_1, B_1, \ldots, B_7, A_8, B_8$ are the coded bits, the puncturing pattern repeats every 18 coded bits, and $A_1, B_2, A_4, B_5, A_7, B_8$, are the punctured bit positions. The puncturing pattern p6 is complementary to, but not a cyclic shift of, original puncturing pattern p1 and partially complementary to puncturing patterns p2 and p3. In some example embodiments, the puncturing pattern p6 can be used for a 4$^{th}$ retransmission in combination with any of the puncturing pattern sequence combinations noted above. In some examples, the puncturing pattern p6 may be used in place of any one of puncturing patterns p2 to p5 in any of the puncturing pattern sequence combinations noted above.

In some examples, the original puncturing pattern p1 may be used for the 3$^{rd}$ retransmission, even though it is not strictly in compliance with criteria (2) noted above.

In various example embodiments, the puncturing patterns described above may be applied in different transmission orders than noted above, and in some examples other puncturing patterns may be included in the set of BCC code rate ¾ puncturing patterns.

In example embodiments, the design of the puncturing patterns selected for use as partially complementary patterns in the set of BCC code rate ¾ puncturing patterns, and the order of the puncturing patterns, is based on the results of empirical experiments that have been performed to determine the puncturing pattern candidates and usage orders that have the best error correction performance.

BCC Code Rate ⅔

Figures 8, 9, 10, 11, 12, 13:
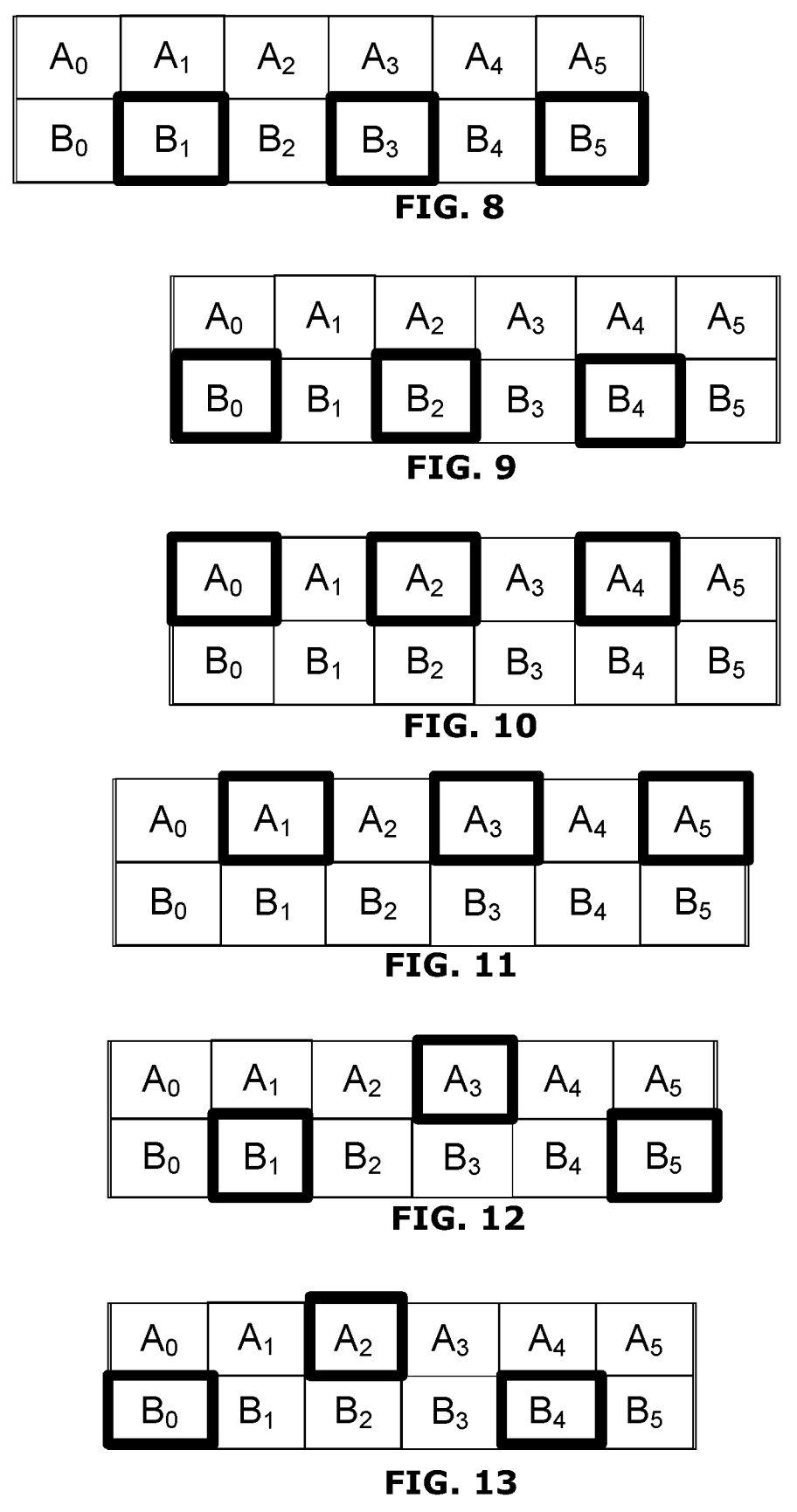

A set of puncturing patterns for use in a HARQ scheme for BCC code rate ⅔ will now be described, which are also intended to be applied by a BCC encoder such as that used in current 802.11 protocol compliant transmitters. In this regard, in an example embodiment, the BCC code rate ⅔ puncturing pattern specified in the current 802.11 protocol, illustrated in FIG. 8, is included in the set for use as the puncturing pattern in respect of an original data transmission. As indicated in FIG. 8, the bits $A_0, B_0, A_1, B_1, \ldots, B_4, A_5, B_5$ are the coded bits and the puncturing pattern $$q1 = \begin{pmatrix} 111111 \\ 101010 \end{pmatrix}$$

repeats every 12 coded bits. As noted above, in FIG. 8 the bit positions enclosed by bold squares, $B_1, B_3, B_5$ are the punctured bit positions.

FIG. 9 illustrates a puncturing pattern $$q2 = \begin{pmatrix} 111111 \\ 010101 \end{pmatrix}$$

that meets the dual criteria of being complementary to and a cyclical column shift of original transmission puncturing pattern q1. As indicated in FIG. 9, the bits $A_0, B_0, A_1, B_1, \ldots, B_4, A_5, B_5$ are the coded bits and the puncturing pattern repeats every 12 coded bits, and bit positions $B_0, B_2, B_4$ are the punctured bit positions. In example embodiments, the puncturing pattern q2 is used for the $1^{st}$ retransmission.

Regarding $2^{nd}$ retransmissions and beyond, no further puncturing patterns exist that are complementary to both puncturing patterns q1 and q2 and are cyclic column shifts of either puncturing patterns q1 or q2. However, several options exist for puncturing patterns that are complementary to both puncturing patterns q1 and q2. By way of example, FIG. 10 illustrates a further puncturing pattern $$q3 = \begin{pmatrix} 010101 \\ 111111 \end{pmatrix}$$

that meets the criteria of being complementary to puncturing patterns q1 and q2. As indicated in FIG. 10, the bits $A_0, B_0, A_1, B_1, \ldots, B_4, A_5, B_5$ are the coded bits and the puncturing pattern repeats every 12 coded bits, and bit positions $A_0, A_2, A_4$ are the punctured bit positions. FIG. 11 illustrates a further puncturing pattern $$q4 = \begin{pmatrix} 101010 \\ 111111 \end{pmatrix}$$

that meets the criteria of being complementary to puncturing patterns q1, q2 and q3 as well as being a cyclic column shift or puncturing pattern q3. As indicated in FIG. 11, the bits $A_0, B_0, A_1, B_1, \ldots, B_4, A_5, B_5$ are the coded bits and the puncturing pattern repeats every 12 coded bits, and bit positions $A_1, A_3, A_5$ are the punctured bit positions.

In one example embodiments, puncturing patterns q1, q2, q3, and q4 are respectively applied for an original transmission, a $1^{st}$ retransmission, a $2^{nd}$ retransmission and a $3^{rd}$ retransmission, in that order. In another example embodiment, puncturing patterns q1, q2, q4, and q3 are respectively applied for an original transmission, a $1^{st}$ retransmission, a $2^{nd}$ retransmission and a $3^{rd}$ retransmission, in that order.

In various example embodiments, the puncturing patterns may be applied in different transmission orders than noted above, and in some examples other puncturing patterns may be included in the set of BCC code rate ⅔ puncturing patterns.

In example embodiments, the design of the puncturing patterns selected for use as partially complementary patterns in the set of BCC code rate ⅔ puncturing patterns, and the order of the puncturing patterns, is based on the results of empirical experiments that have been performed to determine the puncturing pattern candidates and usage orders that have the best error correction performance.

Other examples of puncturing patterns that may be included in the set of BCC code rate ⅔ puncturing patterns are shown in FIGS. 12 to 23. FIG. 12 illustrates a puncturing pattern $$\begin{pmatrix} 111011 \\ 101110 \end{pmatrix},$$

where the bits $A_0, B_0, A_1, B_1, \ldots, B_4, A_5, B_5$ are the coded bits and the puncturing pattern repeats every 12 coded bits, and bit positions $A_3, B_1, B_5$ are the punctured bit positions. FIG. 13 illustrates a puncturing pattern $$\begin{pmatrix} 110111 \\ 011101 \end{pmatrix},$$

where the bits $A_0, B_0, A_1, B_1, \ldots, B_4, A_5, B_5$ are the coded bits and the puncturing pattern repeats every 12 coded bits, and bit positions $B_0, A_2, B_4$ are the punctured bit positions. FIG. 14 illustrates a puncturing pattern $$\begin{pmatrix} 101111 \\ 111010 \end{pmatrix},$$

where the bits $A_0, B_0, A_1, B_1, \ldots, B_4, A_5, B_5$ are the coded bits and the puncturing pattern repeats every 12 coded bits, and bit positions $A_1, B_3, B_5$ are the punctured bit positions. FIG. 15 illustrates a puncturing pattern $$\begin{pmatrix} 011111 \\ 110101 \end{pmatrix},$$

where the bits $A_0, B_0, A_1, B_1, \ldots, B_4, A_5, B_5$ are the coded bits and the puncturing pattern repeats every 12 coded bits, and bit positions $A_0, B_2, B_4$ are the punctured bit positions.

FIG. 16 illustrates a puncturing pattern $$\begin{pmatrix} 111110 \\ 101011 \end{pmatrix},$$

where the bits $A_0, B_0, A_1, B_1, \ldots, B_4, A_5, B_5$ are the coded bits and the puncturing pattern repeats every 12 coded bits, and bit positions $B_1, B_3, A_5$ are the punctured bit positions.

FIG. 17 illustrates a puncturing pattern $$\begin{pmatrix} 111101 \\ 010111 \end{pmatrix},$$

where the bits $A_0, B_0, A_1, B_1, \ldots, B_4, A_5, B_5$ are the coded bits and the puncturing pattern repeats every 12 coded bits, and bit positions $B_0, B_2, A_4$ are the punctured bit positions.

FIG. 18 illustrates a puncturing pattern $$\begin{pmatrix} 101110 \\ 111011 \end{pmatrix},$$

where the bits $A_0, B_0, A_1, B_1, \ldots, B_4, A_5, B_5$ are the coded bits and the puncturing pattern repeats every 12 coded bits, and bit positions $A_1, B_3, A_5$ are the punctured bit positions.

FIG. 19 illustrates a puncturing pattern $$\begin{pmatrix} 011101 \\ 110111 \end{pmatrix},$$

where the bits $A_0, B_0, A_1, B_1, \ldots, B_4, A_5, B_5$ are the coded bits and the puncturing pattern repeats every 12 coded bits, and bit positions $A_0, B_2, A_5$ are the punctured bit positions.

FIG. 20 illustrates a puncturing pattern $$\begin{pmatrix} 111010 \\ 101111 \end{pmatrix},$$

where the bits $A_0, B_0, A_1, B_1, \ldots, B_4, A_5, B_5$ are the coded bits and the puncturing pattern repeats every 12 coded bits, and bit positions $B_1, A_3, A_5$ are the punctured bit positions.

FIG. 21 illustrates a puncturing pattern $$\begin{pmatrix} 110101 \\ 011111 \end{pmatrix},$$

where the bits $A_0, B_0, A_1, B_1, \ldots, B_4, A_5, B_5$ are the coded bits and the puncturing pattern repeats every 12 coded bits, and bit positions $B_0, A_2, A_4$ are the punctured bit positions.

FIG. 22 illustrates a puncturing pattern $$\begin{pmatrix} 101011 \\ 111110 \end{pmatrix},$$

where the bits $A_0, B_0, A_1, B_1, \ldots, B_4, A_5, B_5$ are the coded bits and the puncturing pattern repeats every 12 coded bits, and bit positions $A_1, A_3, B_5$ are the punctured bit positions.

FIG. 23 illustrates a puncturing pattern $$\begin{pmatrix} 010111 \\ 111101 \end{pmatrix},$$

where the bits $A_0, B_0, A_1, B_1, \ldots, B_4, A_5, B_5$ are the coded bits and the puncturing pattern repeats every 12 coded bits, and bit positions $A_0, A_2, B_4$ are the punctured bit positions.

BCC Code Rate 5/6

Figures 24, 25, 26:
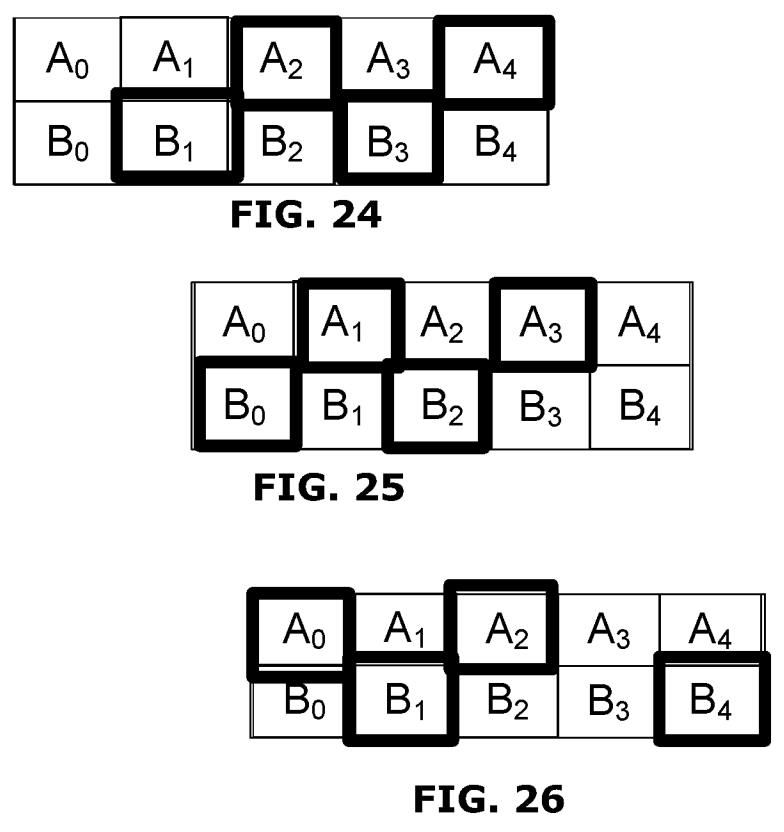

A set of puncturing patterns for use in a HARQ scheme for BCC code rate 5/6 will now be described, which are also intended to be applied by a BCC encoder such as that used in current 802.11 protocol compliant transmitters. In this regard, in an example embodiment, the BCC code rate 5/6 puncturing pattern specified in the current 802.11 protocol, illustrated in FIG. 24, is included in the set for use as the puncturing pattern in respect of an original data transmission. As indicated in FIG. 24, the bits $A_0, B_0, A_1, B_1, \ldots, B_3, A_4, B_4$ are the coded bits and the puncturing pattern $$r1 = \begin{pmatrix} 11010 \\ 10101 \end{pmatrix}$$

repeats every 10 coded bits. As noted above, in FIG. 24 the bit positions enclosed by bold squares, $B_1, A_2, B_3, A_4$ are the punctured bit positions.

FIG. 25 illustrates a puncturing pattern $$r2 = \begin{pmatrix} 10101 \\ 01011 \end{pmatrix}$$

that meets the dual criteria of being complementary to and a cyclical column shift of original transmission puncturing pattern r1. As indicated in FIG. 25, the bits $A_0, B_0, A_1, B_1, \ldots, B_3, A_4, B_4$ are the coded bits and the puncturing pattern repeats every 10 coded bits, and bit positions $B_0, A_1, B_2, A_3$ are the punctured bit positions. In example embodiments, the puncturing pattern r2 is used for the $1^{st}$ retransmission.

Regarding $2^{nd}$ retransmissions and beyond, no further puncturing patterns exist that are complementary to both puncturing patterns r1 and r2 and are cyclic column shifts of either puncturing patterns r1 or r2. However, several options exist for puncturing patterns that are complementary to both puncturing patterns r1 and r2, or complementary to immediately preceding patterns r2 and partially complementary to complementary to both original puncturing pattern r1. By way of example, FIG. 26 illustrates a further puncturing pattern $$r3 = \begin{pmatrix} 01011 \\ 10110 \end{pmatrix}$$

that meets the criteria of being complementary to puncturing pattern r2 and partially complementary to puncturing pattern r1. As indicated in FIG. 26, the bits $A_0, B_0, A_1, B_1, \ldots, B_3, A_4, B_4$ are the coded bits and the puncturing pattern repeats every 10 coded bits, and bit positions $A_0, B_1, A_2, B_4$ are the punctured bit positions.

In one example embodiment, puncturing patterns r1, r2, and r3 are respectively applied for an original transmission, a $1^{st}$ retransmission, and a $2^{nd}$ retransmission, in that order. In another example embodiment, puncturing patterns r1, r2, r1, and r3 are respectively applied for an original transmission, a $1^{st}$ retransmission, a $2^{nd}$ retransmission and a $3^{rd}$ retransmission, in that order.

In various example embodiments, the puncturing patterns may be applied in different transmission orders than noted above, and in some examples other puncturing patterns may be included in the set of BCC code rate ⅚ puncturing patterns.

In example embodiments, the design of the puncturing patterns selected for use as partially complementary patterns in the set of BCC code rate ⅚ puncturing patterns, and the order of the puncturing patterns, is based on the results of empirical experiments that have been performed to determine the puncturing pattern candidates and usage orders that have the best error correction performance.

Other examples of puncturing patters that may be included in the set off BCC code rate ⅚ puncturing patterns are shown in FIGS. 27 to 32.

Figure 27:
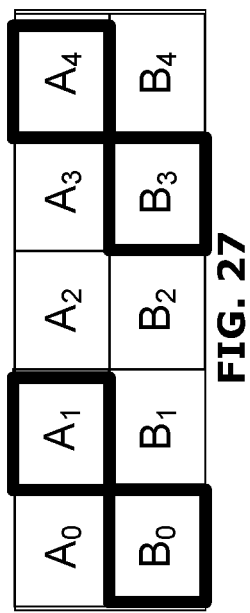

FIG. 27 illustrates a puncturing pattern $$\begin{pmatrix} 10110 \\ 01101 \end{pmatrix}$$

wherein the bits $A_0, B_0, A_1, B_1, \ldots, B_3, A_4, B_4$ are the coded bits and the puncturing pattern repeats every 10 coded bits, and bit positions $B_0, A_1, B_3, A_4$ are the punctured bit positions.

Figure 28:
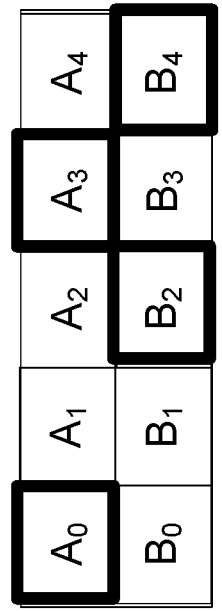

FIG. 28 illustrates a puncturing pattern $$\begin{pmatrix} 01101 \\ 11010 \end{pmatrix}$$

wherein the bits $A_0, B_0, A_1, B_1, \ldots, B_3, A_4, B_4$ are the coded bits and the puncturing pattern repeats every 10 coded bits, and bit positions $A_0, B_2, A_3, B_4$ are the punctured bit positions.

Figure 29:
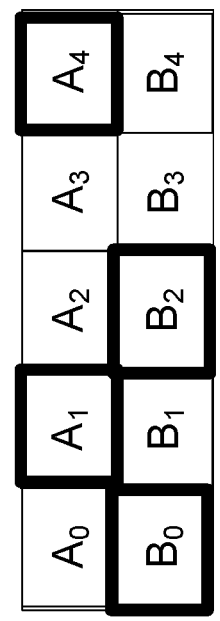

FIG. 29 illustrates a puncturing pattern $$\begin{pmatrix} 10110 \\ 01011 \end{pmatrix}$$

wherein the bits $A_0, B_0, A_1, B_1, \ldots, B_3, A_4, B_4$ are the coded bits and the puncturing pattern repeats every 10 coded bits, and bit positions $B_0, A_1, B_2, A_4$ are the punctured bit positions.

Figure 30:
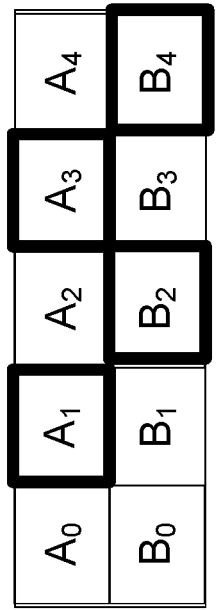

FIG. 30 illustrates a puncturing pattern $$\begin{pmatrix} 10101 \\ 11010 \end{pmatrix}$$

wherein the bits $A_0, B_0, A_1, B_1, \ldots, B_3, A_4, B_4$ are the coded bits and the puncturing pattern repeats every 10 coded bits, and bit positions $A_1, B_2, A_3, B_4$ are the punctured bit positions.

Figure 31:
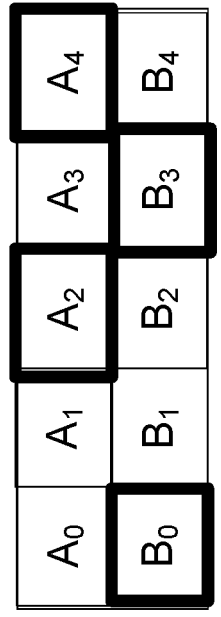

FIG. 31 illustrates a puncturing pattern $$\begin{pmatrix} 11010 \\ 01101 \end{pmatrix}$$

wherein the bits $A_0, B_0, A_1, B_1, \ldots, B_3, A_4, B_4$ are the coded bits and the puncturing pattern repeats every 10 coded bits, and bit positions $B_0, A_2, B_3, A_4$ are the punctured bit positions.

Figure 32:
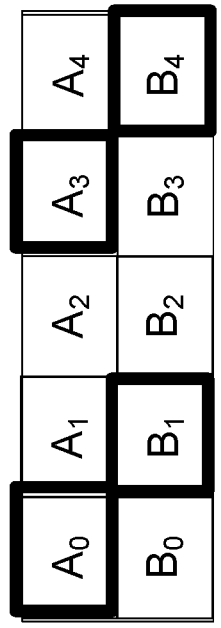

FIG. 32 illustrates a puncturing pattern $$\begin{pmatrix} 01101 \\ 10110 \end{pmatrix}$$

wherein the bits $A_0, B_0, A_1, B_1, \ldots, B_3, A_4, B_4$ are the coded bits and the puncturing pattern repeats every 10 coded bits, and bit positions $A_0, B_1, A_3, B_4$ are the punctured bit positions.

General

Figure 35:
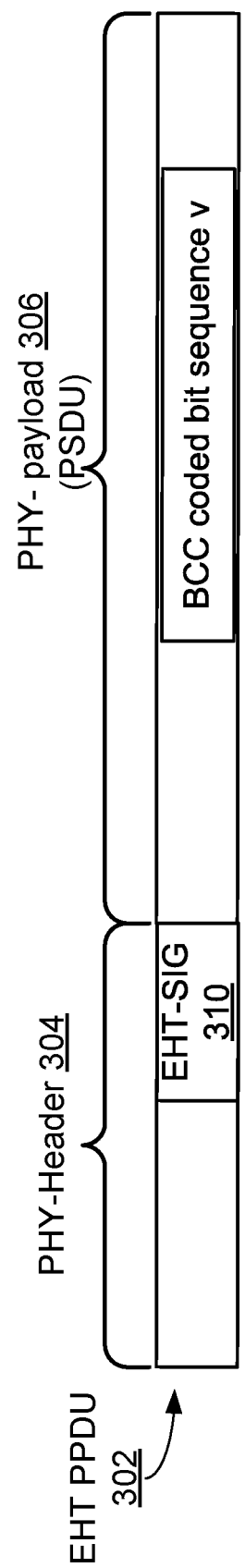
FIG. 35 is an example of a packet or data unit format that can be used for transmitting punctured BCC coded bit sequences according to example embodiments.

In example embodiments, the BCC encoded bit sequences (e.g., coded bit sequence v) generated using the puncturing codes described above are included in a packet that is sent by the transmitter. With reference to FIG. 35, in example embodiments the packet may take the form of an EHT physical layer (PHY) protocol data unit (PPDU) 302, with one or more coded bit sequences v represented as symbols in the PHY-payload (e.g., PHY service data unit (PSDU)) of the PPDU 302. The packet will include a physical header 304. In some example embodiments, information is included in the physical header 304 that enables the receiver to determine what puncturing pattern has been used for the BCC encoded information included in the packet. For example, in cases where a predetermined order of puncturing patterns that is known to both the transmitter and receiver is used, the physical header 304 (for example an EHT SIG header field 310) may include a HARQ retransmission index that specifies if the BCC coded bit sequence v corresponds to an original transmission, a $1^{st}$ retransmission, a $2^{nd}$ re-transmission, and so on. Accordingly, in such examples the HARQ retransmission index indicates to which transmission event in a set of possible transmission events (e.g. original transmission, a $1^{st}$ retransmission, a $2^{nd}$ re-transmission, and so on), the punctured coded bit sequence corresponds.

In some example embodiments, the transmitter may be configured to adaptively select the puncturing pattern to use for retransmissions based on feedback from the receiver or on monitored conditions of the communication channel, in which case the transmitter may include an indication in the physical header 304 identifying the puncturing pattern used for the retransmission.

Figure 33:
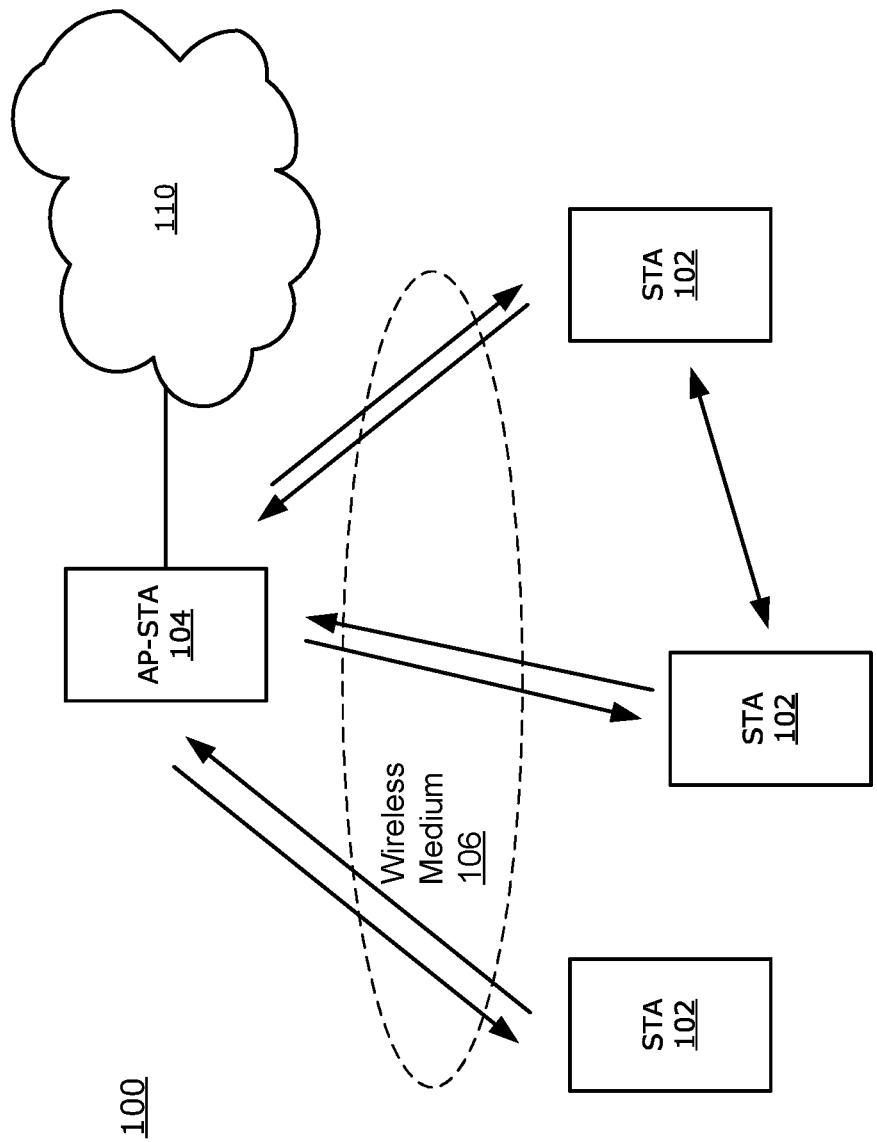
FIG. 33 is a block diagram illustrating a communication system in which example embodiments may be applied.
Figure 34:
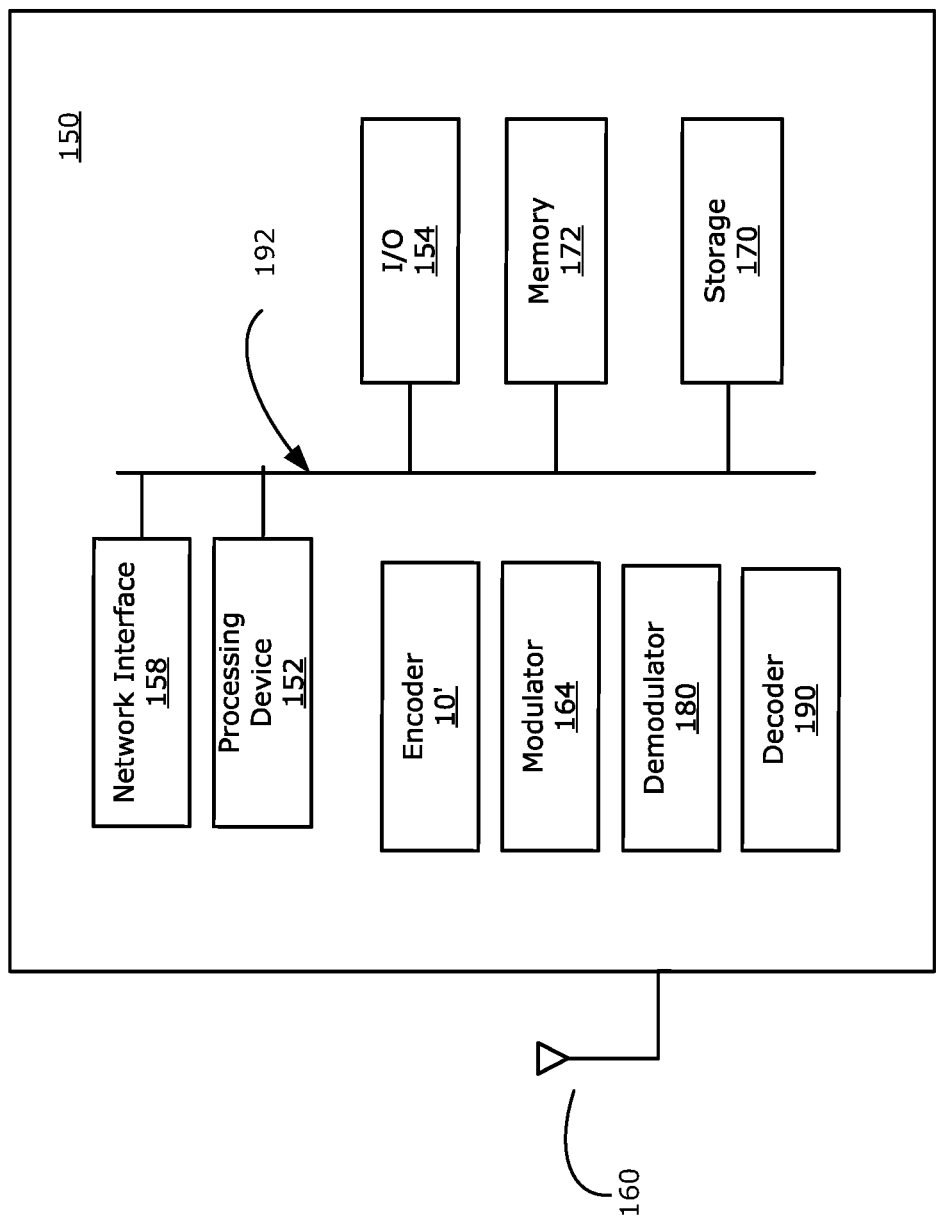
FIG. 34 is a block diagram illustrating an example processing system in accordance with one implementation of the present disclosure.

An example of an environment in which the error control procedures described above can operate will be provided with reference to FIGS. 33 and 34. FIG. 33 illustrates a communication network 100 comprising a plurality of stations (STAs) that can include fixed, portable, and moving stations. The example of FIG. 33 illustrates a single fixed STA, access-point station (AP-STA) 104, and a plurality of STAs 102 that may be portable or mobile. Each of the STAs 102 and AP-STA 104 may include a transmitter, a receiver, an encoder, a decoder, a modulator, and/or demodulator as described herein. The network 100 may operate according to one or more communications or data standards or technologies, however in at least some examples the network 100 is a WLAN, and in at least some examples is a next generation Wi-Fi compliant network that operates in accordance with one or more protocols from the 802.11 family of protocols.

Each STA 102 may be a laptop, a desktop PC, PDA, Wi-Fi phone, wireless transmit/receive unit (WTRU), mobile station (MS), mobile terminal, smartphone, mobile telephone, sensor, internet of things (IOT) device, or other wireless enabled computing or mobile device. In some embodiments, a STA 102 comprises a machine which has the capability to send, receive, or send and receive data in the communications network 100 but which performs primary functions other than communications. In some embodiments, a machine includes an apparatus or device with means to transmit and/or receive data through the communications network 100 but such apparatus or device is not typically operated by a user for the primary purpose of communications. The AP-STA 104 may comprise a network access interface which functions as a wireless transmission and/or reception point for STAs 102 in the network 100. The AP-STA 104 may be connected to a backhaul network 110 which enables data to be exchanged between the AP-STA 104 and other remote networks (including for example the Internet), nodes, APs, and devices (not shown). The AP-STA 104 may support communications through unlicensed radio frequency spectrum wireless medium 106 with each STA 102 by establishing uplink and downlink communications channels with each STA 102, as represented by the arrows in FIG. 33. In some examples, STAs 102 may be configured to communicate with each other. Communications in the network 100 may be unscheduled, scheduled by the AP-STA 104 or by a scheduling or management entity (not shown) in the network 100, or a mix of scheduled and unscheduled communications.

FIG. 34 illustrates an example processing system 150, which may be used to implement methods and systems described herein, such as the STA 102 or the AP-STA 104. Other processing systems suitable for implementing the methods and systems described in the present disclosure may be used, which may include components different from those discussed below. Although FIG. 34 shows a single instance of each component, there may be multiple instances of each component in the processing system 150.

The processing system 150 may include one or more processing devices 152, such as a processor, a microprocessor, an application-specific integrated circuit (ASIC), a field-programmable gate array (FPGA), a dedicated logic circuitry, or combinations thereof. The processing system 150 may also include one or more input/output (I/O) interfaces 154, which may enable interfacing with one or more appropriate input devices and/or output devices (not shown). One or more of the input devices and/or output devices may be included as a component of the processing system 150 or may be external to the processing system 150. The processing system 150 may include one or more network interfaces 158 for wired or wireless communication with a network. In example embodiments, network interfaces 158 include one or more wireless transceivers that enable communications in a WLAN such as network 100. Network interfaces 158 may also include interfaces for wired or wireless communication with networks, such as but not limited to, an intranet, the Internet, a P2P network, a WAN, LAN, and/or a cellular or mobile communications network such as a 5G NR, 4G LTE or other network as noted above. The network interface(s) 158 may include interfaces for wired links (e.g., Ethernet cable) and/or wireless links (e.g., one or more radio frequency links) for intra-network and/or inter-network communications. The network interface(s) 158 may provide wireless communication via one or more transmitters or transmitting antennas, one or more receivers or receiving antennas, and various signal processing hardware and software, for example. In this regard, some network interface(s) 158 may include respective processing systems that are similar to processing system 150. In this example, a single antenna 160 is shown, which may serve as both transmitting and receiving antenna. However, in other examples there may be separate antennas for transmitting and receiving. The network interface(s) 158 may be configured for sending and receiving data to the backhaul network 110 or to other STAs, user devices, access points, reception points, transmission points, network nodes, gateways or relays (not shown) in the network 100.

The processing system 150 may also include one or more storage units 170, which may include a mass storage unit such as a solid state drive, a hard disk drive, a magnetic disk drive and/or an optical disk drive. The processing system 150 may include one or more memories 172, which may include a volatile or non-volatile memory (e.g., a flash memory, a random access memory (RAM), and/or a read-only memory (ROM)). The non-transitory memory(ies) 172 may store instructions for execution by the processing device(s) 152, such as to carry out the present disclosure. The memory(ies) 172 may include other software instructions, such as for implementing an operating system and other applications/functions. In some examples, one or more data sets and/or module(s) may be provided by an external memory (e.g., an external drive in wired or wireless communication with the processing system 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In example embodiments the processing system 150 includes one or more BCC encoders 10 for encoding input data bit sequences to generate punctured coded bit sequences using the puncturing patterns and methods described above. The processing system 150 includes a modulator 164 for modulating coded punctured bit sequence to symbols. The modulator 164 performs modulation on the coded bit sequences (e.g., by modulation techniques such as BPSK, QPSK, 16 QAM, or 64 QAM). In some examples, instructions coded in the memory 172 may configure processing device 152 to perform the functions of the encoder 10 and/or the modulator 164, such that the encoder 10 and/or the modulator 164 may not be distinct physical modules of the processing system 150. In some examples, the encoder 10 and the modulator 164 may be embodied within a transmitter module that is part of a network interface 158 of the processing system 150. In some examples, the transmitting antenna 160, the encoder 10, and the modulator 164 may be embodied as a transmitter component external to the processing system 150, and may simply communicate the source words from the processing system 150.

The processing system 150 may include a demodulator 180 and one or more decoders 190 for processing a received signal. The demodulator 180 may perform demodulation on a received modulated signal (e.g., a BPSK, QPSK, 16 QAM, or 64 QAM signal). The decoder 190 may then perform appropriate decoding on the demodulated signal, in order to recover the original date bit sequences contained in the received signal. In some examples, instructions coded in the memory 172 may configure processing device 152 to perform the functions of the demodulator 180 and/or the decoder 190, such that the demodulator 180 and/or the decoder 190 may not be distinct physical modules of the processing system 150. In some examples, the demodulator 180 and the decoder 190 may be embodied within a receiver module of a network interface 158 of the processing system 150. In some examples, the receiving antenna 160, demodulator 180 and decoder 190 may be embodied as a receiver component external to the processing system 150, and may simply communicate the signal decoded from the received signal to the processing system 150.

There may be a bus 192 providing communication among components of the processing system 150, including the processing device(s) 152, I/O interface(s) 154, network interface(s) 158, storage unit(s) 170, memory(ies) 172, encoder 162, modulator 164, demodulator 180 and decoder 190. The bus 192 may be any suitable bus architecture including, for example, a memory bus, a peripheral bus or a video bus.

Figure 36:
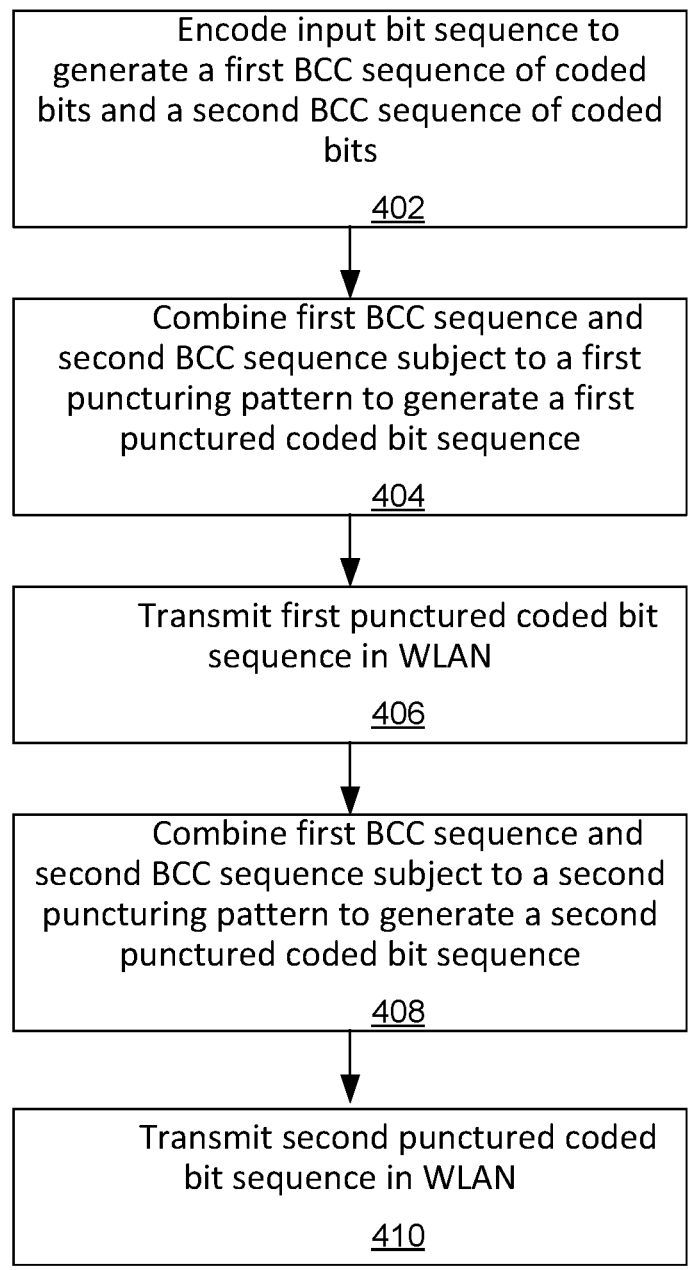
FIG. 36 is a flow chart of actions performed at a processing system according to an example embodiment.

An example of a method that may be performed by processing system 150 in accordance with example embodiments is shown in FIG. 36. As indicated at block 402, binary convolution coding (BCC) is applied to an input bit sequence using a first generator polynomial and a second generator polynomial to respectively generate a first BCC sequence of coded bits and a second BCC sequence of coded bits. As indicated at block 404, the coded bits from the first BCC sequence and second BCC sequence are combined to generate a first punctured coded bit sequence by alternatively selecting bits from the first BCC sequence and second BCC sequence subject to a first puncturing pattern that indicates bits that are to be omitted from the combined sequence. The first punctured coded bit sequence is modulated and included in a packet (for example an EHT PPDU 302) that is transmitted in a WLAN (e.g., network 100), as indicated in block 406.

As indicated in block 408, the coded bits from the first BCC sequence and second BCC sequence are then combined to generate a second punctured coded bit sequence by alternatively selecting bits from the first BCC sequence and second BCC sequence subject to a second puncturing pattern that is different from the first puncturing pattern. The second punctured coded bit sequence is modulated and included in a packet (for example an EHT PPDU 302) that is transmitted in a WLAN (e.g., network 100), as indicated in block 410.

In example embodiments, the processing system 150 is configured to employ a HARQ retransmission scheme whereby a data sequence may be retransmitted for an intended receiving device (e.g. a STA 102) in the event that one or more predefined conditions occur. These predefined conditions may for example include passage of a pre-defined duration post-transmission without receiving any acknowledgement from the intended receiving device, or alternatively, upon receiving a negative acknowledgement (NACK) from the intended receiving device. Accordingly, in at least some examples, the actions indicated in blocks 408 and 410 are performed to support a first retransmission under a HARQ retransmission scheme. As noted above, the second puncturing pattern is at least semi-complementary to the first puncturing pattern to cause at least some bits of the coded data that were omitted in the first punctured coded bit sequence to be included in the second punctured coded bit sequence.

In some examples, further retransmissions may be occur using further punctured coded bit sequences generated by puncturing the coded data using other puncturing patterns that are different than at least an immediately preceding puncturing pattern.

In example embodiments, the BCC encoder 10 of processing system 150 is configured to apply a coding rate of ¾, ⅔ or ⅚.

When the BCC encoder 10 applies a coding rate of ¾, at block 402, 9 bit sequences of the input bit sequence are each BCC coded to generate 9 coded bits of the first BCC sequence and 9 coded bits of the second BCC sequence, respectively. At block 404, the first puncturing pattern indicates 3 bits of the 9 coded bits of the first BCC sequence and 3 bits of the second BCC sequence to omit from bits included in a 12 bit sequence of the first punctured coded bit sequence. At block 408, the second puncturing pattern indicates 3 bits of the 9 coded bits of the first BCC sequence and 3 bits of the second BCC sequence to omit from bits included in a 12 bit sequence of the second punctured coded bit sequence.

As described above in respect of FIGS. 2 to 7, in example embodiments, when the BCC encoder 10 applies a coding rate of ¾, the first puncturing pattern and the second puncturing pattern are each from following group of puncturing patterns: puncturing pattern p1: omit bits 3, 6, and 9 of the first BCC sequence and bits 2, 5 and 8 of the second BCC sequence; puncturing pattern p2: omit bits 2, 5, and 8 of the first BCC sequence and bits 1, 4 and 7 of the second BCC sequence; puncturing pattern p3: omit bits 1, 4, and 7 of the first BCC sequence and bits 3, 6 and 9 of the second BCC sequence; puncturing pattern p4: omit bits 3, 6, and 9 of the first BCC sequence and bits 1, 4 and 7 of the second BCC sequence; puncturing pattern p5: omit bits 1, 4, and 7 of the first BCC sequence and bits 2, 5 and 8 of the second BCC sequence; and puncturing pattern p6: omit bits 2, 5, and 8 of the first BCC sequence and bits 3, 6 and 9 of the second BCC sequence.

When the BCC encoder 10 applies a coding rate of ⅔, at block 402, 6 bit sequences of the input bit sequence are each BCC coded to generate 6 coded bits of the first BCC sequence and 6 coded bits of the second BCC sequence, respectively. At block 404, the first puncturing pattern indicates 3 bits in total of the first BCC sequence and the second BCC sequence to omit from bits included in a 9 bit sequence of the first punctured coded bit sequence. At block 408, the second puncturing pattern indicates 3 bits in total of the first BCC sequence and the second BCC sequence to omit from bits included in a 9 bit sequence of the second punctured coded bit sequence.

As described above in respect of FIGS. 8 to 23, in example embodiments, when the BCC encoder 10 applies a coding rate of ⅔, the first puncturing pattern and the second puncturing pattern are each from the following group of puncturing patterns: puncturing pattern q1: omit bits 2, 4, and 5 of the second BCC sequence; puncturing pattern q2: omit bits 1, 3, and 5 of the second BCC sequence; puncturing pattern q3: omit bits 1, 3, and 5 of the first BCC sequence; puncturing pattern q4: omit bits 2, 4, and 5 of the first BCC sequence; puncturing pattern q5: omit bit 4 of the first BCC sequence and bits 2 and 6 of the second BCC sequence; puncturing pattern q6: omit bit 3 of the first BCC sequence and bits 1 and 5 of the second BCC sequence; puncturing pattern q7: omit bit 2 of the first BCC sequence and bits 4 and 6 of the second BCC sequence; puncturing pattern q8: omit bit 1 of the first BCC sequence and bits 3 and 5 of the second BCC sequence; puncturing pattern q9: omit bit 6 of the first BCC sequence and bits 2 and 4 of the second BCC sequence; puncturing pattern q10: omit bit 5 of the first BCC sequence and bits 1 and 3 of the second BCC sequence; puncturing pattern q11: omit bits 2 and 6 of the first BCC sequence and bit 4 of the second BCC sequence; puncturing pattern q12: omit bits 1 and 5 of the first BCC sequence and bit 3 of the second BCC sequence; puncturing pattern q13: omit bits 4 and 6 of the first BCC sequence and bit 2 of the second BCC sequence; puncturing pattern q14: omit bits 3 and 5 of the first BCC sequence and bit 1 of the second BCC sequence; puncturing pattern q15: omit bits 2 and 4 of the first BCC sequence and bit 6 of the second BCC sequence; and puncturing pattern q16: omit bits 1 and 3 of the first BCC sequence and bit 5 of the second BCC sequence.

When the BCC encoder 10 applies a coding rate of ⅚, at block 402, 5 bit sequences of the input bit sequence are each BCC coded to generate 5 coded bits of the first BCC sequence and 5 coded bits of the second BCC sequence, respectively. At block 404, the first puncturing pattern indicates 2 bits of the first BCC sequence and 2 bits of the second BCC sequence to omit from bits included in a 6 bit sequence of the first punctured coded bit sequence. At block 408, the second puncturing pattern indicates 2 bits of the first BCC sequence and 2 bits of the second BCC sequence to omit from bits included in a 6 bit sequence of the second punctured coded bit sequence.

As described above in respect of FIGS. 24 to 32, in example embodiments, when the BCC encoder 10 applies a coding rate of ⅚ the first puncturing pattern and the second puncturing pattern are each from the following group of puncturing patterns: puncturing pattern r1: omit bits 3 and 5 of the first BCC sequence and bits 2 and 4 of the second BCC sequence; puncturing pattern r2: omit bits 2 and 4 of the first BCC sequence and bits 1 and 3 of the second BCC sequence; puncturing pattern r3: omit bits 1 and 3 of the first BCC sequence and bits 2 and 5 of the second BCC sequence; puncturing pattern r4: omit bits 2 and 5 of the first BCC sequence and bits 1 and 4 of the second BCC sequence; puncturing pattern r5: omit bits 1 and 4 of the first BCC sequence and bits 3 and 5 of the second BCC sequence; puncturing pattern r6: omit bits 2 and 5 of the first BCC sequence and bits 1 and 3 of the second BCC sequence; puncturing pattern r7: omit bits 2 and 4 of the first BCC sequence and bits 3 and 5 of the second BCC sequence; puncturing pattern r8: omit bits 3 and 5 of the first BCC sequence and bits 1 and 4 of the second BCC sequence; and puncturing pattern r9: omit bits 1 and 4 of the first BCC sequence and bits 2 and 5 of the second BCC sequence.

In some example embodiments when a ¾ coding rate is applied, the first puncturing pattern is one of puncturing pattern p1, puncturing pattern p2 and puncturing pattern p3, and the second puncturing pattern is a different one of puncturing pattern p1, puncturing pattern p2 and puncturing pattern p3. In some examples, the first puncturing pattern is puncturing pattern p1 and the second puncturing pattern is one of puncturing pattern p2 and puncturing pattern p3.

In some examples when a ⅔ coding rate is applied, the first puncturing pattern is one of puncturing pattern q1 and puncturing pattern q2 and the second puncturing pattern is the other of puncturing pattern q1 and puncturing pattern q2. In some examples, the first puncturing pattern is puncturing pattern q1 and the second puncturing pattern is puncturing pattern q2.

In some examples when a ⅚ coding rate is applied, the first puncturing pattern is one of puncturing pattern r1 and puncturing pattern r2 and the second puncturing pattern is the other of puncturing pattern r1 and puncturing pattern r2.

In some example, the first puncturing pattern is puncturing pattern r1 and the second puncturing pattern is puncturing pattern r2.

In some examples, the punctured coded bit sequences are transmitted as part of a data unit (e.g. PPDU 302) that includes an indication in a header field (E.G. EHT-SIG field 310) indicating the puncturing pattern used to generate the punctured coded bit sequences. Alternatively, in some examples, the header field (E.G. EHT-SIG field 310) includes a HARQ retransmission index indicating which of a number of possible re-transmissions the re-transmission punctured coded bit sequence corresponds to.

In some example embodiments when a ¾ coding rate is applied, a third punctured coded bit sequence generated is by puncturing the coded data using a third puncturing pattern, the third puncturing pattern is one of puncturing pattern p1, puncturing pattern p2 and puncturing pattern p3. In some examples when a ¾ coding rate is applied, a fourth punctured coded bit sequence is generated by puncturing the coded data using a fourth puncturing pattern that is one of puncturing pattern p4, puncturing pattern p5 and puncturing pattern p6.

In some example embodiments when a ⅔ coding rate is applied, a third punctured coded bit sequence is generated by puncturing the coded data using a third puncturing pattern that is is one of puncturing pattern q3 and puncturing pattern q4. If a fourth punctured coded bit sequence is generated, the coded data is punctured using a fourth puncturing pattern that is different that the third puncturing pattern and is one of puncturing pattern q3 and puncturing pattern q4.

In some example embodiments when a ⅚ coding rate is applied, a third punctured coded bit sequence is generated by puncturing the coded data using a third puncturing pattern, the third puncturing pattern is one of puncturing pattern r3 to puncturing pattern r9.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
    transmitting, in a wireless local area network (WLAN), a second punctured coded bit sequence generated by puncturing coded data using a second puncturing pattern, wherein the coded data has previously been punctured using a first puncturing pattern to generate a first punctured coded bit sequence transmitted in the WLAN, the second puncturing pattern being different than the first puncturing pattern to cause at least some bits of the coded data that were omitted in the first punctured coded bit sequence to be included in the second punctured coded bit sequence, and wherein the second punctured coded bit sequence is transmitted as part of a data unit that includes a header field including an index indicating that the second punctured coded bit sequence is a first re-transmission.

2. The method of claim 1 wherein the coded data includes a first binary convolution coding (BCC) sequence and a second BCC sequence that have each been generated by applying binary convolution coding to an input bit sequence,
    the first punctured coded bit sequence including bits selected alternatively from each of the first BCC sequence and the second BCC sequence subject to the first puncturing pattern,
    the second punctured coded bit sequence including bits selected alternatively from each of the first BCC sequence and the second BCC sequence subject to the second puncturing pattern, and
    the first punctured coded bit sequence and the second punctured code bit sequence each have a coding rate of ¾,
    9 bit sequences of the input bit sequence are each BCC coded according to first and second generator polynomials to generate 9 coded bits of the first BCC sequence and 9 coded bits of the second BCC sequence, respectively,
    the first puncturing pattern indicates 3 bits of the 9 coded bits of the first BCC sequence and 3 bits of the second BCC sequence to omit from bits included in a 12 bit sequence of the first punctured coded bit sequence; and
    the second puncturing pattern indicates 3 bits of the 9 coded bits of the first BCC sequence and 3 bits of the second BCC sequence to omit from bits included in a 12 bit sequence of the second punctured coded bit sequence.

3. The method of claim 2 wherein the first puncturing pattern and the second puncturing pattern are each from following group of puncturing patterns:
    puncturing pattern p1: omit bits 3, 6, and 9 of the first BCC sequence and bits 2, 5 and 8 of the second BCC sequence;
    puncturing pattern p2: omit bits 2, 5, and 8 of the first BCC sequence and bits 1, 4 and 7 of the second BCC sequence;
    puncturing pattern p3: omit bits 1, 4, and 7 of the first BCC sequence and bits 3, 6 and 9 of the second BCC sequence;
    puncturing pattern p4: omit bits 3, 6, and 9 of the first BCC sequence and bits 1, 4 and 7 of the second BCC sequence;
    puncturing pattern p5: omit bits 1, 4, and 7 of the first BCC sequence and bits 2, 5 and 8 of the second BCC sequence; and
    puncturing pattern p6: omit bits 2, 5, and 8 of the first BCC sequence and bits 3, 6 and 9 of the second BCC sequence.

4. The method of claim 3 comprising:
    prior to transmitting the second punctured coded bit sequence, transmitting, in the WLAN, the first punctured coded bit sequence;
    wherein the first puncturing pattern is one of puncturing pattern p1, puncturing pattern p2 and puncturing pattern p3, and the second puncturing pattern is a different one of puncturing pattern p1, puncturing pattern p2 and puncturing pattern p3.

5. The method of claim 4 wherein the first puncturing pattern is puncturing pattern p1 and the second puncturing pattern is one of puncturing pattern p2 and puncturing pattern p3.

6. The method of claim 5, comprising:
    transmitting, in the WLAN, a third punctured coded bit sequence generated by puncturing the coded data using a third puncturing pattern, the third puncturing pattern being different than at least the second puncturing pattern and is one of puncturing pattern p1, puncturing pattern p2 and puncturing pattern p3.

7. The method of claim 6, comprising:
    transmitting, in the WLAN, a fourth punctured coded bit sequence generated by puncturing the coded data using a fourth puncturing pattern that is one of puncturing pattern p4, puncturing pattern p5 and puncturing pattern p6.

8. The method of claim 1 wherein the coded data includes a first binary convolution coding (BCC) sequence and a second BCC sequence that have each been generated by applying binary convolution coding to an input bit sequence,
    the first punctured coded bit sequence including bits selected alternatively from each of the first BCC sequence and the second BCC sequence subject to the first puncturing pattern,
    the second punctured coded bit sequence including bits selected alternatively from each of the first BCC sequence and the second BCC sequence subject to the second puncturing pattern,
    the first punctured coded bit sequence and the second punctured code bit sequence each have a coding rate of ⅔,
    6 bit sequences of the input bit sequence are each BCC coded according to first and second generator polynomials to generate 6 coded bits of the first BCC sequence and 6 coded bits of the second BCC sequence, respectively,
    the first puncturing pattern indicates 3 bits in total of the first BCC sequence and the second BCC sequence to omit from bits included in a 9 bit sequence of the first punctured coded bit sequence; and
    the second puncturing pattern indicates 3 bits in total of the first BCC sequence and the second BCC sequence to omit from bits included in a 9 bit sequence of the second punctured coded bit sequence.

9. The method of claim 8 wherein the first puncturing pattern and the second puncturing pattern are each from the following group of puncturing patterns:
  puncturing pattern q1: omit bits 2, 4, and 5 of the second BCC sequence;
  puncturing pattern q2: omit bits 1, 3, and 5 of the second BCC sequence;
  puncturing pattern q3: omit bits 1, 3, and 5 of the first BCC sequence;
  puncturing pattern q4: omit bits 2, 4, and 5 of the first BCC sequence;
  puncturing pattern q5: omit bit 4 of the first BCC sequence and bits 2 and 6 of the second BCC sequence;
  puncturing pattern q6: omit bit 3 of the first BCC sequence and bits 1 and 5 of the second BCC sequence;
  puncturing pattern q7: omit bit 2 of the first BCC sequence and bits 4 and 6 of the second BCC sequence;
  puncturing pattern q8: omit bit 1 of the first BCC sequence and bits 3 and 5 of the second BCC sequence;
  puncturing pattern q9: omit bit 6 of the first BCC sequence and bits 2 and 4 of the second BCC sequence;
  puncturing pattern q10: omit bit 5 of the first BCC sequence and bits 1 and 3 of the second BCC sequence;
  puncturing pattern q11: omit bits 2 and 6 of the first BCC sequence and bit 4 of the second BCC sequence;
  puncturing pattern q12: omit bits 1 and 5 of the first BCC sequence and bit 3 of the second BCC sequence;
  puncturing pattern q13: omit bits 4 and 6 of the first BCC sequence and bit 2 of the second BCC sequence;
  puncturing pattern q14: omit bits 3 and 5 of the first BCC sequence and bit 1 of the second BCC sequence;
  puncturing pattern q15: omit bits 2 and 4 of the first BCC sequence and bit 6 of the second BCC sequence; and
  puncturing pattern q16: omit bits 1 and 3 of the first BCC sequence and bit 5 of the second BCC sequence.

10. The method of claim 9 comprising:
  prior to transmitting the second punctured coded bit sequence, transmitting, in the WLAN, the first punctured coded bit sequence;
  wherein the first puncturing pattern is one of puncturing pattern q1 and puncturing pattern q2 and the second puncturing pattern is the other of puncturing pattern q1 and puncturing pattern q2.

11. The method of claim 10, comprising:
  transmitting, in the WLAN, a third punctured coded bit sequence generated by puncturing the coded data using a third puncturing pattern, the third puncturing pattern being one of puncturing pattern q3 and puncturing pattern q4.

12. The method of claim 11, comprising:
  transmitting, in the WLAN, a fourth punctured coded bit sequence generated by puncturing the coded data using a fourth puncturing pattern that is different that the third puncturing pattern and is one of puncturing pattern q3 and puncturing pattern q4.

13. The method of claim 1 wherein the coded data includes a first binary convolution coding (BCC) sequence and a second BCC sequence that have each been generated by applying binary convolution coding to an input bit sequence,
  the first punctured coded bit sequence including bits selected alternatively from each of the first BCC sequence and the second BCC sequence subject to the first puncturing pattern,
  the second punctured coded bit sequence including bits selected alternatively from each of the first BCC sequence and the second BCC sequence subject to the second puncturing pattern
  the first punctured coded bit sequence and the second punctured code bit sequence each have a coding rate of 5/6,
  5 bit sequences of the input bit sequence are each BCC coded according to first and second generator polynomials to generate 5 coded bits of the first BCC sequence and 5 coded bits of the second BCC sequence, respectively,
  the first puncturing pattern indicates 2 bits of the first BCC sequence and 2 bits of the second BCC sequence to omit from bits included in a 6 bit sequence of the first punctured coded bit sequence; and
  the second puncturing pattern indicates 2 bits of the first BCC sequence and 2 bits of the second BCC sequence to omit from bits included in a 6 bit sequence of the second punctured coded bit sequence.

14. The method of claim 13 wherein the first puncturing pattern and the second puncturing pattern are each from the following group of puncturing patterns:
  puncturing pattern r1: omit bits 3 and 5 of the first BCC sequence and bits 2 and 4 of the second BCC sequence;
  puncturing pattern r2: omit bits 2 and 4 of the first BCC sequence and bits 1 and 3 of the second BCC sequence;
  puncturing pattern r3: omit bits 1 and 3 of the first BCC sequence and bits 2 and 5 of the second BCC sequence;
  puncturing pattern r4: omit bits 2 and 5 of the first BCC sequence and bits 1 and 4 of the second BCC sequence;
  puncturing pattern r5: omit bits 1 and 4 of the first BCC sequence and bits 3 and 5 of the second BCC sequence;
  puncturing pattern r6: omit bits 2 and 5 of the first BCC sequence and bits 1 and 3 of the second BCC sequence;
  puncturing pattern r7: omit bits 2 and 4 of the first BCC sequence and bits 3 and 5 of the second BCC sequence;
  puncturing pattern r8: omit bits 3 and 5 of the first BCC sequence and bits 1 and 4 of the second BCC sequence; and
  puncturing pattern r9: omit bits 1 and 4 of the first BCC sequence and bits 2 and 5 of the second BCC sequence.

15. The method of claim 14 comprising:
  prior to transmitting the second punctured coded bit sequence, transmitting, in the WLAN, the first punctured coded bit sequence;
  wherein the first puncturing pattern is one of puncturing pattern r1 and puncturing pattern r2 and the second puncturing pattern is the other of puncturing pattern r1 and puncturing pattern r2.

16. The method of claim 15, comprising:
  transmitting, in the WLAN, a third punctured coded bit sequence generated by puncturing the coded data using a third puncturing pattern, the third puncturing pattern being one of puncturing pattern r3 to puncturing pattern r9.

17. A method comprising:
  transmitting, in a wireless local area network (MAN), a second punctured coded bit sequence generated by puncturing coded data using a second puncturing pattern, wherein the coded data has previously been punctured using a first puncturing pattern to generate a first punctured coded bit sequence transmitted in the WLAN, the second puncturing pattern being different than the first puncturing pattern such that at least some bits of the coded data that were omitted in the first punctured coded bit sequence are included in the second punctured coded bit sequence, and wherein the second punctured coded bit sequence is transmitted as part of a data unit that includes a header field including an indicator that the second puncturing pattern was used to generate the second punctured coded bit sequence.

18. A method of transmitting hybrid automatic repeat request (HARQ) re-transmissions in a wireless local area network (WLAN), comprising:
transmitting, in the WLAN, a data unit including a re-transmission punctured coded bit sequence generated by puncturing coded data using a retransmission puncturing pattern, wherein the coded data has previously been punctured using a different puncturing pattern to generate a different punctured coded bit sequence transmitted in the WLAN,
the data unit including a header field that includes a HARQ retransmission index indicating which re-transmission the re-transmission punctured coded bit sequence corresponds to.

19. An encoder for encoding data for transmission in a wireless local area network (WLAN), the encoder being configured to:
apply binary convolution coding (BCC) to an input bit sequence using a first generator polynomial and a second generator polynomial to respectively generate a first BCC sequence of coded bits and a second BCC sequence of coded bits;
combine the coded bits from the first BCC sequence and the coded bits from the second BCC sequence subject to a first puncturing pattern to generate a first punctured coded bit sequence for the transmission in the WLAN; and
combine the coded bits from the first BCC sequence and the coded bits from the second BCC sequence subject to a second puncturing pattern that is different that the first puncturing pattern to generate a second punctured coded bit sequence for the transmission in the WLAN that includes at least some coded bits that are omitted from the first punctured coded bit sequence, wherein the second punctured coded bit sequence is transmitted as part of a data unit that includes a header field including an index indicating that the second punctured coded bit sequence is a first re-transmission.

20. The encoder of claim 19 wherein the encoder is configured to apply a coding rate of ¾, ⅔ or ⅚, wherein:
(1) when the encoder applies a coding rate of ¾:
9 bit sequences of the input bit sequence are each BCC coded to generate 9 coded bits of the first BCC sequence and 9 coded bits of the second BCC sequence, respectively,
the first puncturing pattern indicates 3 bits of the 9 coded bits of the first BCC sequence and 3 bits of the second BCC sequence to omit from bits included in a 12 bit sequence of the first punctured coded bit sequence,
the second puncturing pattern indicates 3 bits of the 9 coded bits of the first BCC sequence and 3 bits of the second BCC sequence to omit from bits included in a 12 bit sequence of the second punctured coded bit sequence,
and
the first puncturing pattern and the second puncturing pattern are each from following group of puncturing patterns:
puncturing pattern p1: omit bits 3, 6, and 9 of the first BCC sequence and bits 2, 5 and 8 of the second BCC sequence;
puncturing pattern p2: omit bits 2, 5, and 8 of the first BCC sequence and bits 1, 4 and 7 of the second BCC sequence;
puncturing pattern p3: omit bits 1, 4, and 7 of the first BCC sequence and bits 3, 6 and 9 of the second BCC sequence;
puncturing pattern p4: omit bits 3, 6, and 9 of the first BCC sequence and bits 1, 4 and 7 of the second BCC sequence;
puncturing pattern p5: omit bits 1, 4, and 7 of the first BCC sequence and bits 2, 5 and 8 of the second BCC sequence; and
puncturing pattern p6: omit bits 2, 5, and 8 of the first BCC sequence and bits 3, 6 and 9 of the second BCC sequence;

(2) when the encoder applies a coding rate of ⅔:
6 bit sequences of the input bit sequence are each BCC coded to generate 6 coded bits of the first BCC sequence and 6 coded bits of the second BCC sequence, respectively,
the first puncturing pattern indicates 3 bits in total of the first BCC sequence and the second BCC sequence to omit from bits included in a 9 bit sequence of the first punctured coded bit sequence,
the second puncturing pattern indicates 3 bits in total of the first BCC sequence and the second BCC sequence to omit from bits included in a 9 bit sequence of the second punctured coded bit sequence,
and
the first puncturing pattern and the second puncturing pattern are each from the following group of puncturing patterns:
puncturing pattern q1: omit bits 2, 4, and 5 of the second BCC sequence;
puncturing pattern q2: omit bits 1, 3, and 5 of the second BCC sequence;
puncturing pattern q3: omit bits 1, 3, and 5 of the first BCC sequence;
puncturing pattern q4: omit bits 2, 4, and 5 of the first BCC sequence;
puncturing pattern q5: omit bit 4 of the first BCC sequence and bits 2 and 6 of the second BCC sequence;
puncturing pattern q6: omit bit 3 of the first BCC sequence and bits 1 and 5 of the second BCC sequence;
puncturing pattern q7: omit bit 2 of the first BCC sequence and bits 4 and 6 of the second BCC sequence;
puncturing pattern q8: omit bit 1 of the first BCC sequence and bits 3 and 5 of the second BCC sequence;
puncturing pattern q9: omit bit 6 of the first BCC sequence and bits 2 and 4 of the second BCC sequence;
puncturing pattern q10: omit bit 5 of the first BCC sequence and bits 1 and 3 of the second BCC sequence;
puncturing pattern q11: omit bits 2 and 6 of the first BCC sequence and bit 4 of the second BCC sequence;
puncturing pattern q12: omit bits 1 and 5 of the first BCC sequence and bit 3 of the second BCC sequence;
puncturing pattern q13: omit bits 4 and 6 of the first BCC sequence and bit 2 of the second BCC sequence;
puncturing pattern q14: omit bits 3 and 5 of the first BCC sequence and bit 1 of the second BCC sequence;
puncturing pattern q15: omit bits 2 and 4 of the first BCC sequence and bit 6 of the second BCC sequence; and
puncturing pattern q16: omit bits 1 and 3 of the first BCC sequence and bit 5 of the second BCC sequence; and (3) when the encoder applies a coding rate of 5/6:
5 bit sequences of the input bit sequence are each BCC coded to generate 5 coded its of the first BCC sequence and 5 coded bits of the second BCC sequence, respectively,
the first puncturing pattern indicates 2 bits of the first BCC sequence and 2 bits of the second BCC sequence to omit from bits included in a 6 bit sequence of the first punctured coded bit sequence;
the second puncturing pattern indicates 2 bits of the first BCC sequence and 2 bits of the second BCC sequence to omit from bits included in a 6 bit sequence of the second punctured coded bit sequence;
and
the first puncturing pattern and the second puncturing pattern are each from the following group of puncturing patterns:
puncturing pattern r1: omit bits 3 and 5 of the first BCC sequence and bits 2 and 4 of the second BCC sequence;
puncturing pattern r2: omit bits 2 and 4 of the first BCC sequence and bits 1 and 3 of the second BCC sequence;
puncturing pattern r3: omit bits 1 and 3 of the first BCC sequence and bits 2 and 5 of the second BCC sequence;
puncturing pattern r4: omit bits 2 and 5 of the first BCC sequence and bits 1 and 4 of the second BCC sequence;
puncturing pattern r5: omit bits 1 and 4 of the first BCC sequence and bits 3 and 6 of the second BCC sequence;
puncturing pattern r6: omit bits 2 and 5 of the first BCC sequence and bits 1 and 3 of the second BCC sequence;
puncturing pattern r7: omit bits 2 and 4 of the first BCC sequence and bits 3 and 5 of the second BCC sequence;
puncturing pattern r8: omit bits 3 and 5 of the first BCC sequence and bits 1 and 4 of the second BCC sequence;
and puncturing pattern r9: omit bits 1 and 4 of the first BCC sequence and bits 2 and 5 of the second BCC sequence.

\* \* \* \* \*

UNITED STATES PATENT AND TRADEMARK OFFICE
CERTIFICATE OF CORRECTION

PATENT NO. : 11,239,948 B2  
APPLICATION NO. : 16/809347  
DATED : February 1, 2022  
INVENTOR(S) : Jung Hoon Suh et al.

Page 1 of 1

It is certified that error appears in the above-identified patent and that said Letters Patent is hereby corrected as shown below:

In the Claims

Claim 17, Column 26, Line 58; delete "MAN" and insert --WLAN--.

Claim 20, Column 29, Line 3; delete "its" and insert --bits--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*